US012684654B2

(12) United States Patent
Hosseini et al.

(10) Patent No.: US 12,684,654 B2
(45) Date of Patent: Jul. 14, 2026

(54) SYSTEM INFORMATION BLOCK AND PAGING TRANSMISSION PRIORITY FOR SIDELINK RELAYING

(71) Applicant: QUALCOMM INCORPORATED, San Diego, CA (US)

(72) Inventors: Kianoush Hosseini, San Diego, CA (US); Peng Cheng, Beijing (CN); Karthika Paladugu, Hyderabad (IN); Hong Cheng, Basking Ridge, NJ (US)

(73) Assignee: Qualcomm Incorporated, San Diego, CA (US)

( * ) Notice: Subject to any disclaimer, the term of this patent is extended or adjusted under 35 U.S.C. 154(b) by 261 days.

(21) Appl. No.: 18/553,655

(22) PCT Filed: May 8, 2021

(86) PCT No.: PCT/CN2021/092342
§ 371 (c)(1),
(2) Date: Oct. 2, 2023

(87) PCT Pub. No.: WO2022/236463
PCT Pub. Date: Nov. 17, 2022

(65) Prior Publication Data
US 2024/0196481 A1     Jun. 13, 2024

(51) Int. Cl.
*H04W 88/04*     (2009.01)
*H04W 48/08*     (2009.01)
(Continued)

(52) U.S. Cl.
CPC ........... *H04W 88/04* (2013.01); *H04W 48/08* (2013.01); *H04W 68/02* (2013.01); *H04W 72/40* (2023.01); *H04W 92/18* (2013.01)

(58) Field of Classification Search
CPC ..... H04W 88/04; H04W 48/08; H04W 68/02; H04W 72/40; H04W 92/18
See application file for complete search history.

(56) References Cited

U.S. PATENT DOCUMENTS 9,713,195 B2 * 7/2017 Lee ........................ H04W 72/56
2014/0302850 A1 * 10/2014 Young ................... H04W 88/04
455/436
(Continued)

FOREIGN PATENT DOCUMENTS

CN     109076492 A * 12/2018 ......... H04W 60/005
CN     110972082 A     4/2020
(Continued)

OTHER PUBLICATIONS

Supplementary Partial European Search Report—EP21941046—Search Authority—Berlin—Dec. 11, 2024.
(Continued)

*Primary Examiner* — Parth Patel
(74) *Attorney, Agent, or Firm* — Holland & Hart LLP

(57)     ABSTRACT

Methods, systems, and devices for wireless communications are described. A user equipment (UE) may receive, from a base station, a system information block, a paging message, or both. The UE may determine a priority level associated with relaying the system information block, the paging message, or both on a sidelink channel. The UE may transmit, to a second UE on the sidelink channel, the system information block, the paging message, or both based on the priority level.

26 Claims, 14 Drawing Sheets

(51) Int. Cl.
  *H04W 68/02*    (2009.01)
  *H04W 72/40*    (2023.01)
  *H04W 92/18*    (2009.01)

(56)                References Cited

U.S. PATENT DOCUMENTS

| | | | | |
|---|---|---|---|---|
| 2015/0230267 | A1* | 8/2015 | Lee | H04W 72/23 |
| | | | | 370/336 |
| 2018/0295556 | A1* | 10/2018 | Baek | H04W 8/26 |
| 2019/0021126 | A1* | 1/2019 | Chun | H04W 76/20 |
| 2019/0174416 | A1* | 6/2019 | Zhang | H04W 48/16 |
| 2019/0373579 | A1* | 12/2019 | Nord | H04W 76/10 |
| 2019/0387498 | A1* | 12/2019 | Li | H04W 40/12 |
| 2021/0037513 | A1 | 2/2021 | Wu et al. | |
| 2021/0235332 | A1* | 7/2021 | Schmidt | H04W 36/0061 |
| 2021/0266764 | A1* | 8/2021 | Khanfouci | H04W 24/02 |
| 2021/0345363 | A1* | 11/2021 | Zhang | H04W 72/569 |
| 2021/0385822 | A1* | 12/2021 | Chae | H04W 72/02 |
| 2021/0410215 | A1* | 12/2021 | Kuo | H04W 76/14 |
| 2022/0014985 | A1* | 1/2022 | Da Silva | H04W 36/00838 |
| 2022/0217575 | A1* | 7/2022 | Wang | H04W 28/0268 |
| 2022/0225448 | A1* | 7/2022 | Li | H04B 7/15 |
| 2022/0338205 | A1* | 10/2022 | Lee | H04W 72/543 |
| 2022/0394602 | A1* | 12/2022 | Orsino | H04W 48/16 |
| 2022/0394674 | A1* | 12/2022 | Chen | H04W 72/0446 |
| 2023/0007623 | A1* | 1/2023 | Da Silva | H04W 76/19 |
| 2023/0084017 | A1* | 3/2023 | Wang | H04W 52/0229 |
| | | | | 370/311 |
| 2023/0180097 | A1* | 6/2023 | Zhang | H04B 7/1555 |
| | | | | 370/315 |
| 2023/0180267 | A1* | 6/2023 | Chae | H04L 5/0048 |
| | | | | 370/328 |

| | | | | |
|---|---|---|---|---|
| 2023/0239834 | A1* | 7/2023 | Ye | H04W 68/02 |
| | | | | 455/458 |
| 2023/0337066 | A1* | 10/2023 | Wu | H04W 36/305 |
| 2023/0337259 | A1* | 10/2023 | Son | H04W 76/28 |
| 2023/0371119 | A1* | 11/2023 | Park | H04W 40/22 |
| 2023/0413229 | A1* | 12/2023 | Wang | H04W 4/06 |
| 2024/0179679 | A1* | 5/2024 | Zhang | H04W 68/02 |
| 2024/0187037 | A1* | 6/2024 | Liu | H04L 1/08 |
| 2024/0187935 | A1* | 6/2024 | Rao | H04W 72/02 |
| 2024/0196293 | A1* | 6/2024 | Babaei | H04W 36/00837 |
| 2024/0196455 | A1* | 6/2024 | Löhr | H04W 28/0268 |
| 2024/0196481 | A1* | 6/2024 | Hosseini | H04W 48/08 |
| 2024/0237125 | A1* | 7/2024 | Kim | H04W 76/20 |

FOREIGN PATENT DOCUMENTS

| | | |
|---|---|---|
| CN | 111356234 A | 6/2020 |
| EP | 3490308 B1 | 4/2020 |

OTHER PUBLICATIONS

Supplementary European Search Report—EP21941046—Search Authority—The Hague—Mar. 21, 2025.

Apple: "Discussion on Inter-UE Coordination", 3GPP TSG-RAN WG2 Meeting #113bis-e, R2-2103854, Apr. 20, 2021 (Apr. 20, 2021), Section 2.

International Search Report and Written Opinion—PCT/CN2021/092342—ISA/EPO—Jan. 27, 2022.

Samsung: "Sidelink and Uplink Prioritization", 3GPP TSG-RAN WG2 Meeting #107bis, R2-1912628, Chongqing, China, Oct. 14-18, 2019, 2 Pages, Section 2.

* cited by examiner 105-a

205

SIB/Paging Message 215

115-a 110-a

SIB/Paging Message 215

210

115-b

200

410

420

415

405

400

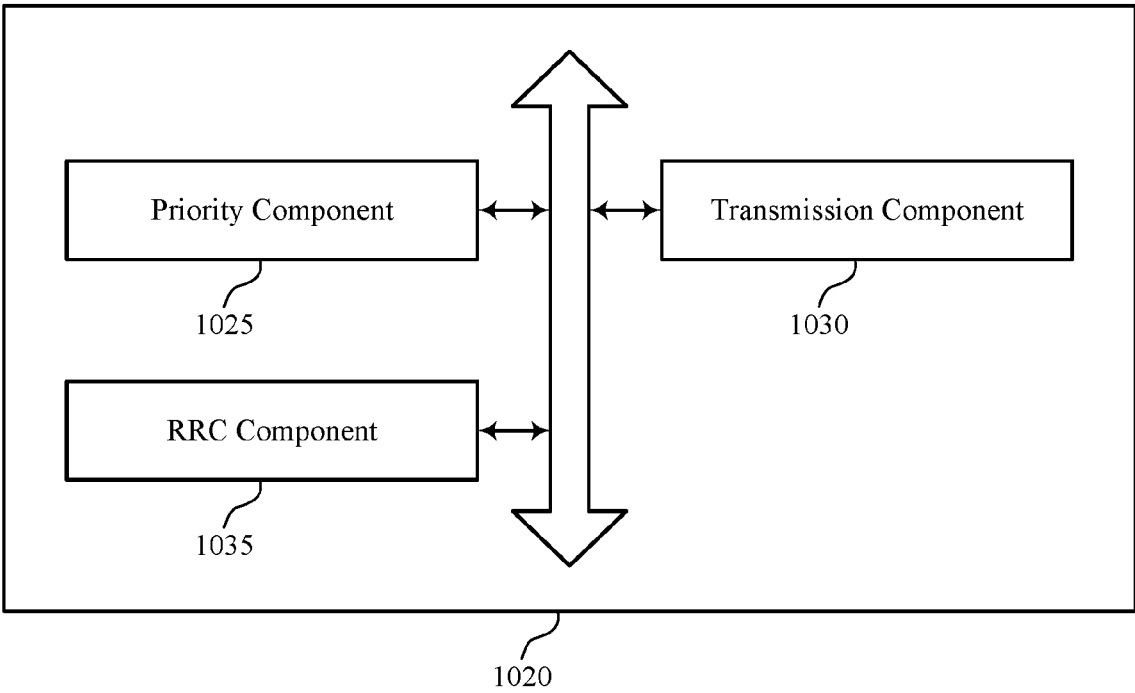
Priority Component
1025
Transmission Component
1030
RRC Component
1035
1020
1000
FIG. 10

Receive, from a base station, a system information block, a paging message, or both

1205

Determine a priority level associated with relaying the system information block, the paging message, or both on a sidelink channel

1210

Transmit, to a second UE on the sidelink channel, the system information block, the paging message, or both based at least in part on the priority level

1215

1200

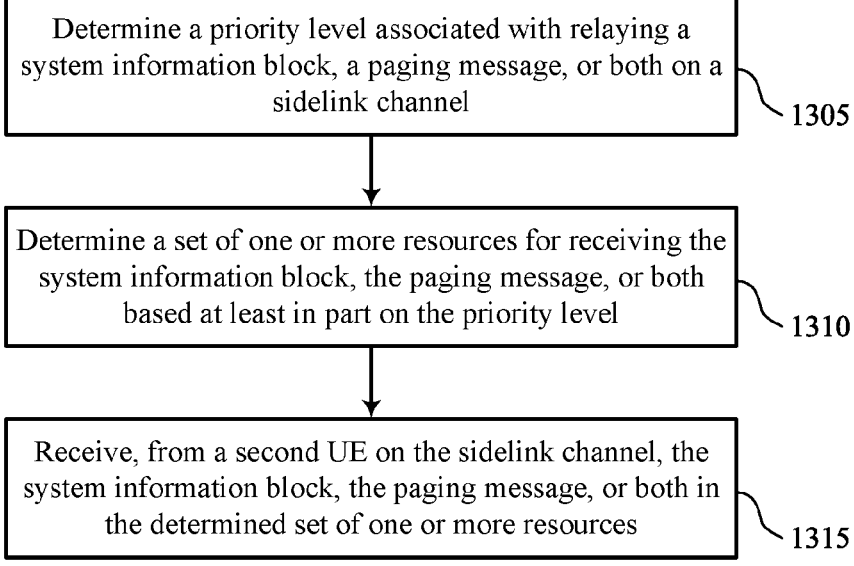

Determine a priority level associated with relaying a system information block, a paging message, or both on a sidelink channel

1305

Determine a set of one or more resources for receiving the system information block, the paging message, or both based at least in part on the priority level

1310

Receive, from a second UE on the sidelink channel, the system information block, the paging message, or both in the determined set of one or more resources

SYSTEM INFORMATION BLOCK AND PAGING TRANSMISSION PRIORITY FOR SIDELINK RELAYING

CROSS REFERENCE

The present application is a 371 national stage filing of International PCT Application No. PCT/CN2021/092342 by Hosseini et al. entitled "SYSTEM INFORMATION BLOCK AND PAGING TRANSMISSION PRIORITY FOR SIDELINK RELAYING," filed May 8, 2021, which is assigned to the assignee hereof, and which is expressly incorporated by reference in its entirety herein.

FIELD OF TECHNOLOGY

The following relates to wireless communications, including system information block and paging transmission priority for sidelink relaying.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may relay messages received from a base station to another UE. Improved techniques for relaying messages may be desired.

SUMMARY

The described techniques relate to improved methods, systems, devices, and apparatuses that support system information block and paging transmission priority for sidelink relaying. A user equipment (UE) may receive a message (e.g., a SIB or a paging message) from a base station and determine a priority level associated with the message. The UE may relay the message over a sidelink channel to another UE based on the priority level. For example, the UE may perform a channel access procedure, resolve a communication conflict, or both, based on the priority level associated with the message.

A method for wireless communications at a first UE is described. The method may include receiving, from a base station, a system information block, a paging message, or both, determining a priority level associated with relaying the system information block, the paging message, or both on a sidelink channel, and transmitting, to a second UE on the sidelink channel, the system information block, the paging message, or both based on the priority level.

An apparatus for wireless communications at a first UE is described. The apparatus may include a processor, memory coupled with the processor, and instructions stored in the memory. The instructions may be executable by the processor to cause the apparatus to receive, from a base station, a system information block, a paging message, or both, determine a priority level associated with relaying the system information block, the paging message, or both on a sidelink channel, and transmit, to a second UE on the sidelink channel, the system information block, the paging message, or both based on the priority level.

Another apparatus for wireless communications at a first UE is described. The apparatus may include means for receiving, from a base station, a system information block, a paging message, or both, means for determining a priority level associated with relaying the system information block, the paging message, or both on a sidelink channel, and means for transmitting, to a second UE on the sidelink channel, the system information block, the paging message, or both based on the priority level.

A non-transitory computer-readable medium storing code for wireless communications at a first UE is described. The code may include instructions executable by a processor to receive, from a base station, a system information block, a paging message, or both, determine a priority level associated with relaying the system information block, the paging message, or both on a sidelink channel, and transmit, to a second UE on the sidelink channel, the system information block, the paging message, or both based on the priority level.

In some examples of the method, apparatuses, and non-transitory computer-readable medium described herein, the, the priority level may be for a signaling radio bearer (SRB) configured for system information, paging messages, or both, and, and the system information, the paging message, or both may be associated with the SRB.

In some examples of the method, apparatuses, and non-transitory computer-readable medium described herein, the priority level for the SRB may be higher than a priority level for a second SRB and lower than a priority level for a third SRB.

In some examples of the method, apparatuses, and non-transitory computer-readable medium described herein, the second SRB may be configured for unicast radio resource control (RRC) messages communicated over an interface between the first UE and the second UE and the third SRB may be configured for non-access stratum (NAS) messages or other types of radio resource control messages.

In some examples of the method, apparatuses, and non-transitory computer-readable medium described herein, the second SRB may be sidelink SRB3 and the third SRB may be sidelink SRB0, sidelink SRB1, or sidelink SRB2.

Some examples of the method, apparatuses, and non-transitory computer-readable medium described herein may further include operations, features, means, or instructions for receiving an indication of the priority level for the SRB in a radio resource control message.

Some examples of the method, apparatuses, and non-transitory computer-readable medium described herein may further include operations, features, means, or instructions for transmitting, to the second UE on the sidelink channel, a sidelink control information message indicating a set of one or more resources for the second UE to receive a message including the system information block, the paging message, or both, where the sidelink control information message includes a field indicating that the message corresponds to system information, paging information, or both.

Some examples of the method, apparatuses, and non-transitory computer-readable medium described herein may further include operations, features, means, or instructions for determining a defined set of one or more transmission occasions for relaying the system information block, the paging message, or both on the sidelink channel and selecting a transmission occasion of the defined set of one or more transmission occasions, where the system information block, the paging message, or both may be transmitted in the selected transmission occasion.

Some examples of the method, apparatuses, and non-transitory computer-readable medium described herein may further include operations, features, means, or instructions for receiving, from the base station, a radio resource control message configuring the defined set of one or more transmission occasions.

Some examples of the method, apparatuses, and non-transitory computer-readable medium described herein may further include operations, features, means, or instructions for performing a channel access procedure for the sidelink channel, where the system information block, the paging message, or both may be transmitted based on the channel access procedure.

In some examples of the method, apparatuses, and non-transitory computer-readable medium described herein, performing the channel access procedure may include operations, features, means, or instructions for sensing the sidelink channel for a time duration and reserving a set of one or more resources on the sidelink channel based on the sensing, where the system information block, the paging message, or both may be transmitted in the reserved set of one or more resources.

In some examples of the method, apparatuses, and non-transitory computer-readable medium described herein, the set of one or more resources may be reserved based on the priority level.

Some examples of the method, apparatuses, and non-transitory computer-readable medium described herein may further include operations, features, means, or instructions for determining a scheduled communication on a second channel at least partially overlapping in time with the transmitting the system information block, the paging message, or both and determining a power scaling value based on the priority level and a second priority level for the second channel, where the system information block, the paging message, or both may be transmitted based on the power scaling value.

Some examples of the method, apparatuses, and non-transitory computer-readable medium described herein may further include operations, features, means, or instructions for determining a scheduled communication on a second channel at least partially overlapping in time with the transmitting the system information block, the paging message, or both, comparing the priority level to a second priority level for the second channel, and refraining from communicating the scheduled communication on the second channel based on the comparing.

Some examples of the method, apparatuses, and non-transitory computer-readable medium described herein may further include operations, features, means, or instructions for selecting a first set of one or more resources for transmitting the system information block, the paging message, or both, determining a scheduled communication on a second channel at least partially overlapping in time with the first set of one or more resources, comparing the priority level to a second priority level for the second channel, and refraining from transmitting the system information block, the paging message, or both in the first set of one or more resources based on the comparing, where the system information block, the paging message, or both may be transmitted in a second set of one or more resources based on the comparing.

Some examples of the method, apparatuses, and non-transitory computer-readable medium described herein may further include operations, features, means, or instructions for receiving, from the base station, a radio resource control message configuring the priority level associated with relaying the system information block, the paging message, or both on the sidelink channel.

Some examples of the method, apparatuses, and non-transitory computer-readable medium described herein may further include operations, features, means, or instructions for transmitting, to the second UE on the sidelink channel, a message indicating the priority level associated with relaying the system information block, the paging message, or both on the sidelink channel.

In some examples of the method, apparatuses, and non-transitory computer-readable medium described herein, the priority level includes a lowest transmission priority.

In some examples of the method, apparatuses, and non-transitory computer-readable medium described herein, the priority level includes a highest transmission priority.

In some examples of the method, apparatuses, and non-transitory computer-readable medium described herein, the priority level includes a first priority index value and the method, apparatuses, and non-transitory computer-readable medium may include further operations, features, means, or instructions for comparing the first priority index value to at least a second priority index value for a second channel, where the system information block, the paging message, or both may be transmitted based on the comparing.

In some examples of the method, apparatuses, and non-transitory computer-readable medium described herein, the system information block, the paging message, or both includes the paging message, and determining the priority level may include operations, features, means, or instructions for determining the priority level based on whether the paging message may be for a common system information block, a dedicated system information block, dedicated data, or a combination thereof.

In some examples of the method, apparatuses, and non-transitory computer-readable medium described herein, the paging message may be for dedicated data and the priority level may be set to a priority level of the dedicated data.

In some examples of the method, apparatuses, and non-transitory computer-readable medium described herein, the system information block, the paging message, or both includes the system information block, and determining the priority level may include operations, features, means, or instructions for determining the priority level based on a broadcast status of the system information block, whether the system information block includes a cell-specific update or an area-specific update, a type of the system information block, whether the system information block may be periodic or on-demand, or a combination thereof.

A method for wireless communications at a first UE is described. The method may include determining a priority level associated with relaying a system information block, a paging message, or both on a sidelink channel, determining a set of one or more resources for receiving the system information block, the paging message, or both based on the priority level, and receiving, from a second UE on the sidelink channel, the system information block, the paging message, or both in the determined set of one or more resources.

An apparatus for wireless communications at a first UE is described. The apparatus may include a processor, memory coupled with the processor, and instructions stored in the memory. The instructions may be executable by the processor to cause the apparatus to determine a priority level associated with relaying a system information block, a paging message, or both on a sidelink channel, determine a set of one or more resources for receiving the system information block, the paging message, or both based on the priority level, and receive, from a second UE on the sidelink channel, the system information block, the paging message, or both in the determined set of one or more resources.

Another apparatus for wireless communications at a first UE is described. The apparatus may include means for determining a priority level associated with relaying a system information block, a paging message, or both on a sidelink channel, means for determining a set of one or more resources for receiving the system information block, the paging message, or both based on the priority level, and means for receiving, from a second UE on the sidelink channel, the system information block, the paging message, or both in the determined set of one or more resources.

A non-transitory computer-readable medium storing code for wireless communications at a first UE is described. The code may include instructions executable by a processor to determine a priority level associated with relaying a system information block, a paging message, or both on a sidelink channel, determine a set of one or more resources for receiving the system information block, the paging message, or both based on the priority level, and receive, from a second UE on the sidelink channel, the system information block, the paging message, or both in the determined set of one or more resources.

Some examples of the method, apparatuses, and non-transitory computer-readable medium described herein may further include operations, features, means, or instructions for receiving, from the second UE on the sidelink channel, a sidelink control information message indicating the set of one or more resources for receiving a message including the system information block, the paging message, or both, where the sidelink control information message includes a field indicating that the message corresponds to system information, paging information, or both.

Some examples of the method, apparatuses, and non-transitory computer-readable medium described herein may further include operations, features, means, or instructions for determining a defined set of one or more transmission occasions for receiving the system information block, the paging message, or both on the sidelink channel, where the defined set of one or more transmission occasions includes the set of one or more resources, performing a wake up procedure prior to the set of one or more resources, and monitoring the set of one or more resources for the system information block, the paging message, or both based on the defined set of one or more transmission occasions.

Some examples of the method, apparatuses, and non-transitory computer-readable medium described herein may further include operations, features, means, or instructions for receiving, from the second UE or a base station, a message configuring the defined set of one or more transmission occasions.

Some examples of the method, apparatuses, and non-transitory computer-readable medium described herein may further include operations, features, means, or instructions for determining a scheduled communication on a second channel at least partially overlapping in time with the set of one or more resources and determining a power scaling value based on the priority level and a second priority level for the second channel, where the system information block, the paging message, or both may be received based on the power scaling value.

Some examples of the method, apparatuses, and non-transitory computer-readable medium described herein may further include operations, features, means, or instructions for scheduling a communication on a second channel at least partially overlapping in time with the set of one or more resources, comparing the priority level to a second priority level for the second channel, and refraining from communicating the scheduled communication on the second channel based on the comparing.

Some examples of the method, apparatuses, and non-transitory computer-readable medium described herein may further include operations, features, means, or instructions for receiving, from the second UE on the sidelink channel, a message configuring the priority level associated with relaying the system information block, the paging message, or both on the sidelink channel.

Some examples of the method, apparatuses, and non-transitory computer-readable medium described herein may further include operations, features, means, or instructions for receiving, from a base station, a radio resource control message configuring the priority level associated with relaying the system information block, the paging message, or both on the sidelink channel.

A method for wireless communications at a base station is described. The method may include determining a priority level associated with relaying a system information block, a paging message, or both on a sidelink channel, transmitting, to a UE, a message configuring the UE with the priority level, and transmitting, to the UE, the system information block, the paging message, or both.

An apparatus for wireless communications at a base station is described. The apparatus may include a processor, memory coupled with the processor, and instructions stored in the memory. The instructions may be executable by the processor to cause the apparatus to determine a priority level associated with relaying a system information block, a paging message, or both on a sidelink channel, transmit, to a UE, a message configuring the UE with the priority level, and transmit, to the UE, the system information block, the paging message, or both.

Another apparatus for wireless communications at a base station is described. The apparatus may include means for determining a priority level associated with relaying a system information block, a paging message, or both on a sidelink channel, means for transmitting, to a UE, a message configuring the UE with the priority level, and means for transmitting, to the UE, the system information block, the paging message, or both.

A non-transitory computer-readable medium storing code for wireless communications at a base station is described. The code may include instructions executable by a processor to determine a priority level associated with relaying a system information block, a paging message, or both on a sidelink channel, transmit, to a UE, a message configuring the UE with the priority level, and transmit, to the UE, the system information block, the paging message, or both.

In some examples of the method, apparatuses, and non-transitory computer-readable medium described herein, the priority level may be for a signaling radio bearer (SRB) configured for system information, paging messages, or both, and, and the system information, the paging message, or both may be associated with the SRB.

In some examples of the method, apparatuses, and non-transitory computer-readable medium described herein, the priority level for the SRB may be higher than a priority level for a second SRB and lower than a priority level for a third SRB.

In some examples of the method, apparatuses, and non-transitory computer-readable medium described herein, the message includes a radio resource control message including a field indicating the priority level.

Some examples of the method, apparatuses, and non-transitory computer-readable medium described herein may further include operations, features, means, or instructions for transmitting, to the UE, a radio resource control message configuring a defined set of one or more transmission occasions for the UE to relay the system information block, the paging message, or both on the sidelink channel.

BRIEF DESCRIPTION OF THE DRAWINGS

FIG. 10 shows a block diagram of a communications manager that supports system information block and paging transmission priority for sidelink relaying in accordance with aspects of the present disclosure.

FIGS. 12 through 14 show flowcharts illustrating methods that support system information block and paging transmission priority for sidelink relaying in accordance with aspects of the present disclosure.

DETAILED DESCRIPTION

In some wireless communication systems, a base station may transmit system information blocks (SIBs) and paging messages to UEs within the coverage area of the base station. A UE that receives a SIB/paging message may relay that SIB/paging message over a sidelink channel to one or more other UEs, which may be within or outside the coverage area of the base station. The UE may perform a channel access procedure to reserve resources for the relaying the SIB/paging message. But the channel access procedure may not reflect that the resources are for a SIB/paging message, which may result in an inefficient or improper reservation of resources. Additionally or alternatively, the reserved channel resources may conflict (e.g., overlap in time, frequency, or both) with the resources for another communication at the relaying UE, which may cause interference or otherwise negatively impact transmission of the SIB/paging message, among other disadvantages.

According to the techniques described herein, a UE may improve resource utilization and communication reliability, among other advantages, by determining priority levels for SIBs/paging messages and using the priority levels as bases for channel access procedures, resolving conflicting communications, or both. For example, a UE with a SIB/paging message to relay may contend for and reserve channel resources based on the priority level(s) of the SIB/paging message. If the UE reserves channel resources that conflict with those for another transmission, the UE may perform power scaling (e.g., adjust a power parameter) for one or both of the transmissions, or cancel or delay one of the transmissions, based on the priority level(s) of the SIB/paging message. In some examples, the SIB/paging message may be associated with one or more radio bearers that are configured for SIB/paging messages and that are prioritized relative to other radio bearers.

Aspects of the disclosure are initially described in the context of wireless communications systems and a process flow. Aspects of the disclosure are further illustrated by and described with reference to apparatus diagrams, system diagrams, and flowcharts that relate to system information block and paging transmission priority for sidelink relaying.

Figure 1:
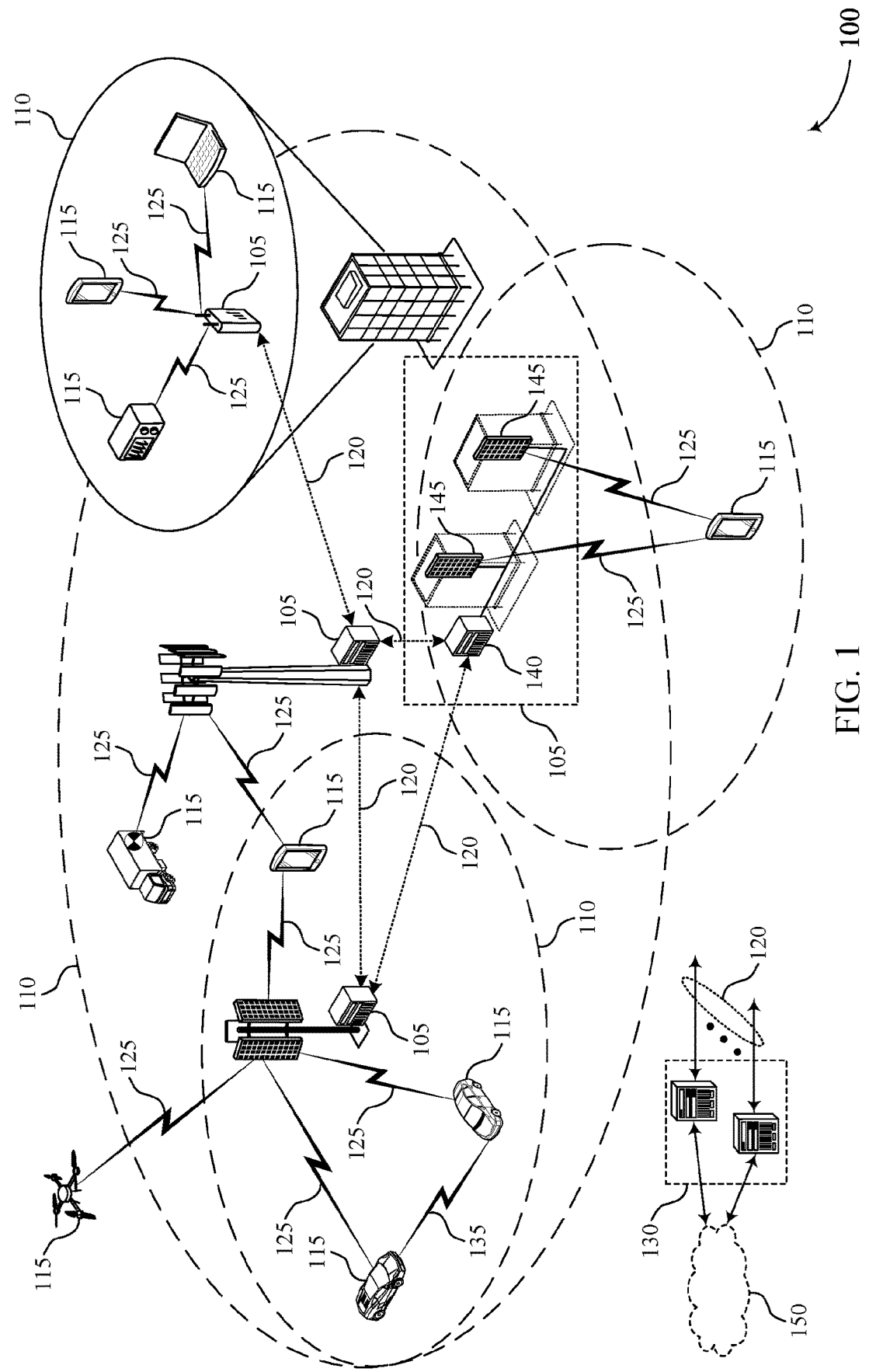
FIG. 1 illustrates an example of a wireless communications system that supports system information block and paging transmission priority for sidelink relaying in accordance with aspects of the present disclosure.

FIG. 1 illustrates an example of a wireless communications system 100 that supports system information block and paging transmission priority for sidelink relaying in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a base station 105 may transmit one or more messages that include system information that provides information about a cell, such as how the cell is configured. For example, a base station 105 may periodically transmit a master information block (MIB) that provides decoding information for one or more SIBs (e.g., SIB1, which may be a first type of SIB), among other system information. In some examples, the MIB may be transmitted in a physical broadcast channel (PBCH) of a synchronization signal block (SSB).

A UE 115 that receives the MIB may use the information in the MIB to receive and decode SIBs (e.g., SIB1, which may be cell-specific) that carry additional system information. In some examples, SIB1 may convey remaining minimum system information (RMSI) that the UE 115 can use, e.g., in addition to system information conveyed by the MIB, for a random access procedure (e.g., a random access channel (RACH) procedure) with the base station 105. SIB1 may additionally or alternatively provide information for acquiring or requesting other types of SIBs, which may be broadcast to multiple UEs 115 (e.g., if the SIBs are cell-specific or area-specific) or unicast to UEs 115 (e.g., UEs in an RRC connected mode). Examples of other types SIBs include: SIB3, which may carry (e.g., indicate) cell reselection parameters as well as an intra-frequency neighbor cell list; SIB6, which may carry earthquake and tsunami warning system (ETWS) information (e.g., notifications); and SIB 8, which may carry commercial mobile alert system (CMAS) information.

In some examples, a UE 115 may request one or more SIBs by transmitting a system information request to the base station 105 (e.g., via RACH transmission). In some cases, SIB1 may provide a physical random access channel (PRACH) configuration for the UE 115 to request the one or more other SIBs. The base station 105 may respond to the system information request by transmitting the requested SIBs. In some examples, SIB1 may indicate periodic transmission of a SIB type, on-demand transmission of a SIB of the SIB type, or both.

In some examples, the base station 105 may update system information for the cell associated with the base station 105. In such a scenario, the base station 105 may transmit a control message to alert UEs 115 about the update. For example, the base station 105 may transmit downlink control information (DCI) of a particular format (e.g., format 1_0) with cyclic redundancy check (CRC) scrambled by a system information radio network temporary identifier (RNTI) (SI-RNTI). The control message (e.g., DCI) may include a system information indicator field (e.g., a one-bit field) that indicates whether the updated system information is for SIB1 or a system information (SI) message (e.g., a SIB other than SIB1).

In some examples, a base station 105 may transmit paging messages to one or more UEs 115. The reason or basis for the paging messages may vary with the RRC state of the recipient UE(s) 115, which may be in an RRC idle state, an RRC inactive state, or an RRC connected state, among other states. In some examples, a base station 105 may page a UE 115 to trigger the UE 115 to initiate an RRC setup procedure, to indicate pending data for the UE 115, to indicate system information updates, or to indicate warning notifications (e.g., ETWS notifications, CMAS notifications, public warning system (PWS) notifications), among other reasons.

To enable paging, a UE 115 may derive paging occasions during which the UE 115 monitors for control information (e.g., DCI) in a physical channel (e.g., the physical downlink control channel (PDCCH)). The control information may schedule a physical channel (e.g., the physical downlink shared control channel (PDSCH)) that includes a paging message for the UE 115, which may also be indicated by the control information. In some examples, a base station 105 may address multiple UEs 115 in a paging message by including a PagingRecord field or parameter for each UE 115 in the paging message. In the RRC idle mode, the PagingRecord for a UE 115 may match the identity given to the UE 115 by upper layer signaling. In the RRC inactive mode, the PagingRecord for a UE 115 may match the full RNTI of the UE 115.

In some examples, the wireless communications system 110 may support short paging messages, which may notify the UE 115 of system information changes (e.g., via systemInfoModification) so that the UE 115 may acquire or request the updated system information. A short paging message may also notify the UE 115 of a warning notification. For example, a short paging message may include, among other parameters, a cmas-Indication parameter, which may indicate a CMAS notification, an etws-Indication parameter, which may indicate an ETWS notification, or both. If transmitted over the Uu interface, which is between the base station 105 and the UE 115, a paging message may be sent on the PDSCH and may be scheduled by DCI format 1_0. The paging message, DCI, or both may be CRC scrambled by a paging RNTI (P-RNTI). In some examples, a short paging message may include a short message indicator field, which may be a 2-bit field. The bits in the short message indicator field may indicate whether scheduling information for paging is present in the DCI, whether a short message is present in the DCI, or both.

In some examples, a UE 115 that receives a message (e.g., a SIB/paging message) may relay (e.g., forward) that SIB/paging message to one or more other UEs 115 (which may be referred to as "remote" UEs). For example, the UE 115 may use a sidelink channel, which may refer to a communication channel between two UEs 115, to relay the SIB/paging message to another UE 115. A sidelink channel may also be referred to as a PC5 channel, where PC5 refers to the interface between two UEs 115. To ensure that channel resources are efficiently and appropriately utilized, the relaying UE 115 (which may be referred to as a "relay" UE 115) may perform a channel access procedure that is based on a priority level associated with the SIB/paging message. Additionally or alternatively, the relay UE 115 may resolve communication conflicts involving the SIB/paging message based on the priority level associated with the SIB/paging message, which may improve communication reliability. In some examples, the SIB/paging message may be associated with one or more radio bearers that are configured for SIB/paging messages and that have priority levels relative to other sidelink radio bearers.

Although described with reference to SIBs and paging messages, the techniques described herein can be implemented for other types of messages that are transmitted from a base station 105 to a UE 115.

Figure 2:
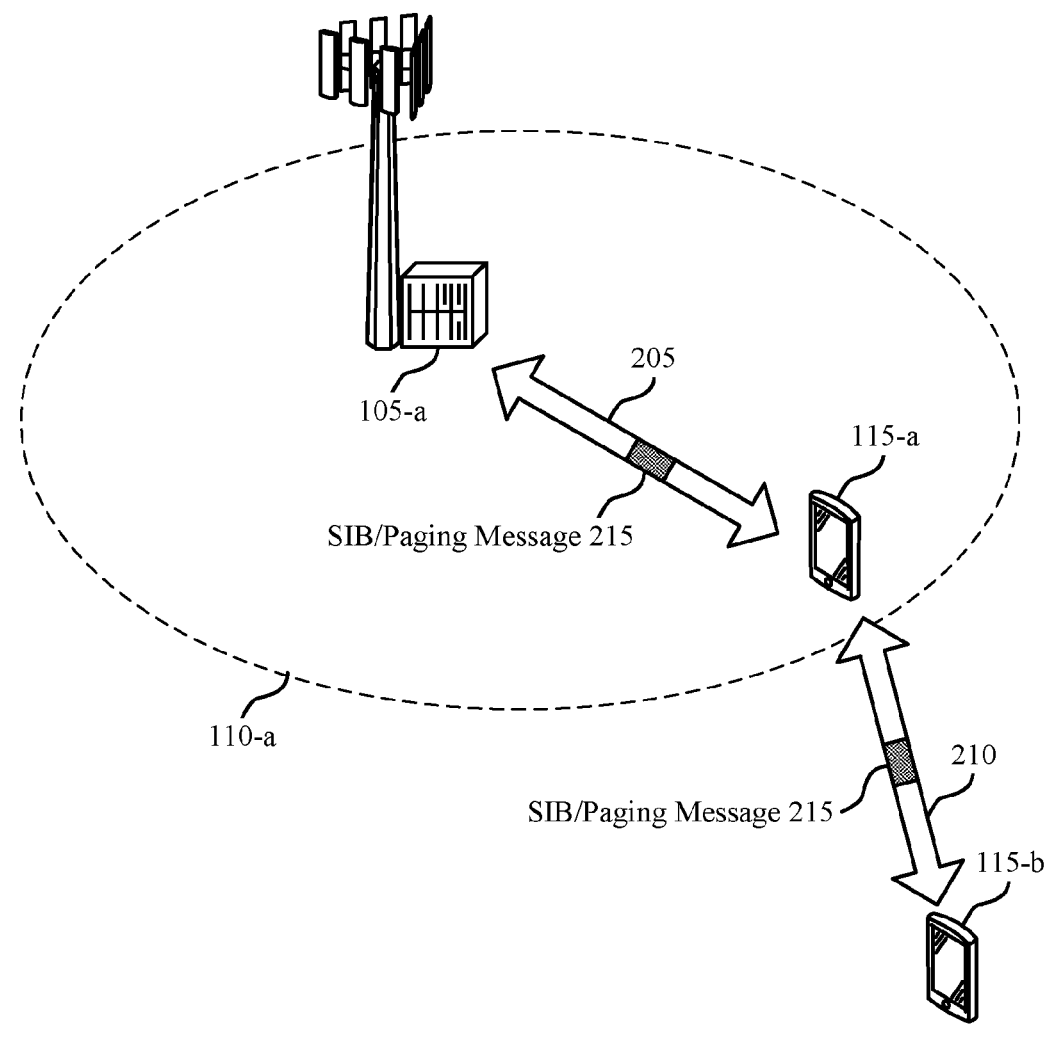
FIG. 2 illustrates an example of a wireless communications system that supports system information block and paging transmission priority for sidelink relaying in accordance with aspects of the present disclosure.

FIG. 2 illustrates an example of a wireless communications system 200 that supports system information block and paging transmission priority for sidelink relaying in accordance with aspects of the present disclosure. In some examples, the wireless communications system 200 may implement aspects of a wireless communications system 100. The wireless communications system 200 may include base station 105-a, UE 115-a, and UE 115-b, which may be examples of the corresponding devices as described herein. Base station 105-a and UE 115-a may communicate via a cellular communication link 205 which may utilize a Uu interface. UE 115-a and UE 115-b may communicate via a sidelink communication link 210, which may utilize the PC5 interface. The wireless communications system 200 may support the relay of SIB/paging messages based on priority levels, which may improve communication reliability and resource utilization.

Base station 105-a may communicate SIBs/paging messages, among other messages, to one or more UEs within the coverage area 110-a of the base station 105-a. For example, base station 105-a may transmit a SIB/paging message 215 to UE 115-a. The SIB/paging message 215 may be transmitted autonomously by the base station 105-a or in response to a request from UE 115-a. In some cases, UE 115-a may receive, from base station 105-a, a control message indicating scheduled resources for the SIB/paging message 215.

In some cases, a UE 115 may not receive a SIB/paging message transmitted by the base station 115-a. For example, UE 115-b may fail to receive the SIB/paging message 215 because UE 115-b is located outside the coverage area 110-a of base station 105-a, or for other reasons, such as interference. In such a scenario, wireless communications system 200 may implement SIB and paging relaying over sidelink communication link 210 to ensure or increase the likelihood that UE 115-b receives the SIB/paging message 215. For example, UE 115-a may relay the SIB/paging message 215 to UE 115-b over the sidelink communication link 210. In some examples, UE 115-a may transmit a sidelink control message to UE 115-b to indicate transmission occasions, reserved resources, or both for relaying the SIB/paging message 215. In a first mode for sidelink resource assignment (e.g., Mode 1), base station 105-a may configure UE 115-a with pools of resources for sidelink communications and schedule transmissions by UE 115-a within the pools. In a second mode for sidelink resource assignment (e.g., Mode 2), base station 105-a may configure UE 115-a with pools of resources for sidelink communications and UE 115-a may select resources within the pools for transmission.

UE 115-a may relay SIB/paging communications based on channel access procedures (e.g., in Mode 2), at defined times (e.g., periodically, during transmission occasions), or both. A defined time may also be referred to as a predefined time or a predetermined time. During a channel access procedure, UE 115-a may contend for, and reserve, resources of a sidelink channel between UE 115-a and UE 115-b. To ensure that sidelink channel resources are efficiently and appropriately utilized, UE 115-a may perform the channel access procedure based on the priority level of the SIB/paging message 215. For example, UE 115-a may select one or more channel access parameters based on the priority level of the SIB/paging message. A channel access procedure may also be referred to as a channel reservation procedure, and may include channel sensing (e.g., listen-before-talk) operations, among others. UE 115-a may transmit control information to UE 115-b indicating the resources reserved by UE 115-b for transmission of the SIB/paging message. In some examples, the control information may be included in a sidelink control information (SCI) message, which may be conveyed over a sidelink control channel. In some examples, the SIB/paging message is conveyed over (e.g., using resources from) the physical sidelink shared channel (PSSCH).

According to the techniques described herein, the SIB/paging message 215 may be associated with a priority level so that UE 115-a may efficiently and reliably forward the SIB/paging message 215 to other UEs, such as UE 115-b.

In some examples, UE 115-a may relay SIB/paging information during defined times (e.g., periodic transmission occasions, which may also be referred to as transmission opportunities). For example, UE 115-a may be configured with a set of transmission occasions during which UE 115-a is permitted to relay SIB/paging information, such as SIB/paging message 215. UE 115-b may also be configured with the set of transmission occasions (e.g., by base station 105-a or UE 115-a) so that UE 115-b can wake up (e.g., if UE 115-b is in idle mode) and monitor the sidelink channel for SIB/paging information during the transmission occasions. In some examples, UE 115-a may perform a channel access procedure to reserve resources for relaying SIB/paging information within a transmission occasion.

In some examples, the resources reserved for relaying SIB/paging information may conflict (e.g., overlap in time, frequency) with the resources for another communication by UE 115-a. In such a scenario, one or both of the communications may experience interference or other negative phenomena arising from the conflict. According to the techniques described herein, UE 115-a may improve communication reliability by resolving the conflict based on the priority level associated with the SIB/paging information. For example, if UE 115-a supports simultaneous communications (e.g., simultaneous transmissions, or simultaneous transmission and reception), UE 115-a may resolve the conflict by implementing power scaling rules that are defined based on the priority level(s) of the channels (or information) involved in the conflict. Power scaling rules may be rules that define how a device modifies the transmission strength or receive strength of the device. If UE 115-a does not support simultaneous communications, UE 115-a may resolve the conflict by delaying or canceling (also referred to as "dropping") one or more of the communications or channels based on the priority level(s) of the communications or channels.

In some examples, the SIB/paging message 215 may be associated with one or more radio bearers that are configured for (e.g., dedicated for, reserved for, allocated for) relaying SIB/paging information. For example, UE 115-a the SIB/paging message 215 may be associated with one or more sidelink signaling radio bearers (SL-SRBs), denoted $SRB_{RELAY}$, that are configured for SIB/paging information forwarding. SL-SRBs may be configured for control plane data and may be different from sidelink data radio bearers (SL-DRBs), which may be configured for user plane data.

In addition to $SRB_{RELAY}$, the SL-SRBs supported by a UE 115 may include: a first SL-SRB (e.g., SRB0), which may be used for RRC messages that use the common control channel (CCCH) logical channel, a second SL-SRB (e.g., SRB1), which may be used for RRC messages as well as NAS messages (prior to establishment of SRB2) that use the dedicated control channel (DCCH) logical channel, a third SL-SRB (e.g., SRB2), which may be used for NAS messages that use the DCCH logical channel, and a fourth SL-SRB (e.g., SRB3), which may be used for unicast RRC messages (e.g., unicast PC5-RRC messages) that are communicated using over the PC5 interface (e.g., between UE 115-a and UE 115-b) using, e.g., the DCCH logical channel. In some examples, SRB3 may be configured for specific RRC messages when UE 115-a is in a dual connectivity mode. One or more of the SL-SRBs may have a respective priority level. For example, $SRB_{RELAY}$ may have a priority level that is higher than the priority level of SL-SRB3 and lower than the priority levels of one or more of SRB0, SRB1, and SRB2. Alternatively, $SRB_{RELAY}$ may have a priority level that is lower than the priority level of SL-SRB3 and higher than the priority levels of one or more of SRB0, SRB1, and SRB2. In some examples, SRB2 may have a lower priority level than SRB1 and may be configured by the network after security activation.

So, a SIB/paging message may be associated with one or more priority levels, which may be assigned to one or more of the SIB/paging message, the channel for the SIB/paging message, and the SRB configured for the SIB/paging message. In some examples, the priority level associated with the SIB/paging message may be configured (possibly permanently, e.g., hardcoded) as the lowest priority level supported by wireless communications system 200, where the lowest priority level refers to the priority level given the least priority. In some examples, the priority level associated with the SIB/paging message may be configured (possibly permanently, e.g., hardcoded) as the highest priority level supported by wireless communications system 200, where the highest priority level refers to the priority level given the most priority.

In some cases, UE 115-a may determine the priority level for SIB/paging communications based on a message (e.g., an RRC message) from base station 105-a. The RRC message from base station 105-a may include a priority level configuration. The priority level configuration and the transmission occasion configuration may be transmitted in the same RRC message or different RRC messages. In some cases, a priority level may correspond to a priority index. UE 115-a may determine a priority level which may correspond to a priority index from the set of priority indices. For example, UE 115-a may determine a priority level indicating a priority index from a set of priority indices (e.g., ranging from zero to seven). In some examples, the lowest priority index (e.g., zero) may correspond to the highest priority level and the highest priority index (e.g., seven) may correspond to the lowest priority level. In some examples, UE 115-a may determine a threshold priority level for SIB/paging communications, which may indicate priority levels that take precedence over SIB/paging communications (or priority levels over which the SIB/paging communications take precedence).

In some examples, the priority level associated with a SIB/paging message may vary with the use case for the SIB/paging message. For example, the priority level for a paging message may depend on whether the paging message is for a common SIB (e.g., a SIB for multiple UEs), for a dedicated SIB (e.g., a SIB for a single UE), or for dedicated data (e.g., data for a single UE). For instance, the priority level for a paging message for a common SIB may be greater than the priority level for a paging message for a dedicated SIB (e.g., because the common SIB is for multiple UEs). In some examples (e.g., when the paging message is for dedicated data), the priority level for a paging message may be based on (e.g., correspond to) the priority level of the unicast data associated with the paging message (e.g., the priority of the logical channel from which the data is to be sent).

In some examples, the priority level associated with a SIB/paging message may be based on (e.g., vary with) the broadcast status (or transmission type) for the SIB/paging message. For example, a SIB that is broadcast by base station 105-a may have a higher priority level (in some examples the highest priority level) than SIB that is unicast by base station 105-a. In some examples, the priority level associated with a SIB may be based on whether the SIB or the system information (e.g., an SI update) conveyed by the SIB is cell-specific or area-specific. For instance, a SIB that is specific to a call ("cell-specific") may be assigned a higher priority level than a SIB that is specific to an area ("area-specific"), or vice versa. In some examples, the priority level associated with a SIB may be based on the type of SIB ("SIB type"). For example, a SIB for a public warning may be assigned the highest priority level, whereas a SIB for updated SI may be assigned a lower priority level. In some examples, the priority level associated with a SIB may be based on whether the system information conveyed by the SIB is periodic SI or on-demand SI (e.g., requested by a UE). For instance, a SIB carrying on-demand SI may be assigned a higher priority level than a SIB carrying periodic SI, or vice versa.

Thus, UE 115-a may perform power scaling, prioritization, and/or resource reservation for relaying a SIB/paging message based on the priority level associated with the SIB/paging message, which may improve communication reliability and resource utilization in the wireless communications system 200. Although shown relaying the SIB/paging message 215 to a single UE 115-b, UE 115-a may relay the SIB/paging message 215 to multiple UEs 115, which may be within or outside of the coverage area 110-a.

Figure 3:
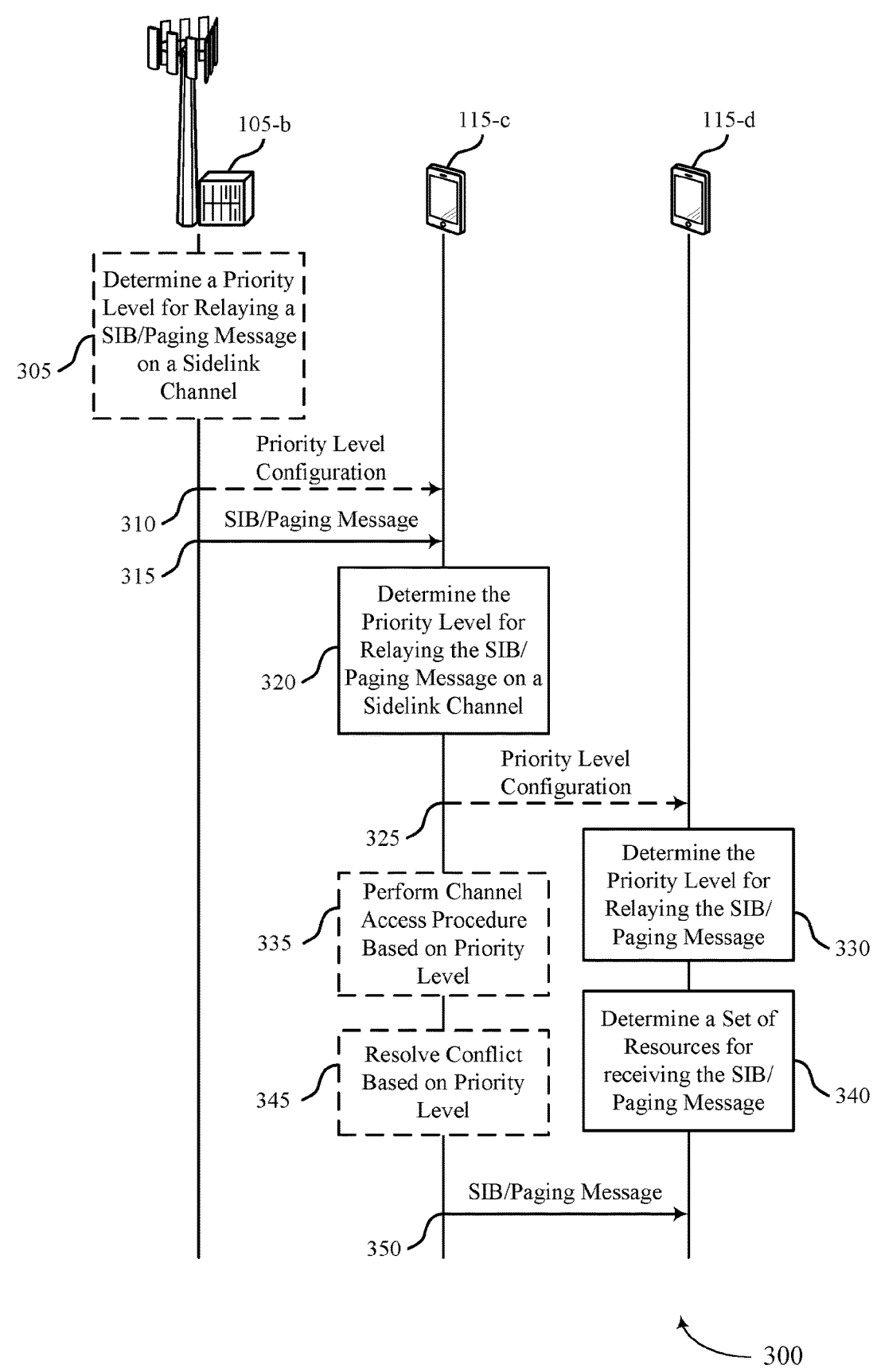
FIG. 3 illustrates an example of a process flow that supports system information block and paging transmission priority for sidelink relaying in accordance with aspects of the present disclosure.

FIG. 3 illustrates an example of a process flow 300 that supports system information block and paging transmission priority for sidelink relaying in accordance with aspects of the present disclosure. In some examples, the process flow 300 may be related to aspects of the wireless communications system 100 or the wireless communications system 200. For example, the process flow 300 may be implemented by a base station 105-b, a UE 115-c, and a UE 115-d, which may be examples of a base station and a UE as described herein. Process flow 300 may illustrate operations that enable priority level-based forwarding of SIB/paging information.

At 305, base station 105-b may determine a priority level associated with relaying a SIB/paging message over a sidelink channel. In some examples, base station 105-b may also determine a set of transmission occasions for UE 115-c to relay SIB/paging information, such as a SIB/paging message.

In some examples, the priority level may be (e.g., as a default) the lowest priority level supported by UE 115-c. In some examples, the priority level may be (e.g., as a default) the highest priority level supported by UE 115-c. In some examples (e.g., for a paging message), the priority level may be based on the use case for the paging message. For example, the priority level may be a first value if the paging message is for a common SIB, a second value if the paging message is for a dedicated SIB, and a third value if the paging message is for dedicated data. In some examples, the priority level for dedicated data may be higher than the priority level for common SIB, which may be higher than the priority level for dedicated SIB. In some examples, the priority level may be the same for different types of paging messages (e.g., the priority level for a paging message for a common SIB may be the same as the priority level for a paging message for a dedicated SIB). The priority level for a paging message may the highest priority level supported by UE 115-c, the lowest priority level supported by UE 115-c, or an intermediate priority level. If the paging message is for dedicated data, the priority level may be based on the priority level associated with the dedicated data (e.g., the priority of the logical channel from which the dedicated data is to be sent).

In some examples (e.g., for a SIB), the priority level may be based on one or more factors associated with the SIB. For example, the priority level may be based on the broadcast status of the SIB (e.g., the priority level may be a first value if the SIB is broadcast and may be a second value if the SIB is unicast). As another example, the priority level may be based on the specificity of the SIB or SI update (e.g., the priority level may be a first value if the SIB/SI update is cell-specific and may be a second value if the SIB/SI update is area-specific). As another example, the priority level may be based on the SIB type (e.g., the priority level may be a first value if the SIB is for a public warning and may be a second value if the SIB is for an SI update). As another example, the priority level may be based on the trigger for the SIB (e.g., the priority level may be a first value for a periodically transmitted SIB and may be a second value for an on-demand SIB requested by a UE).

In some examples, the priority level may be for an SRB (e.g., SRB$_{RELAY}$) that is configured for SIB/paging messages (or, in some examples, configured for relaying SIB/paging messages). The priority level for SRB$_{RELAY}$ may be different from the priority levels for other SRBs. For example, the priority level for SRB$_{RELAY}$ may be higher than the priority level for SRB3, which may be configured for PC5-RRC messages, and may be lower than SRB0, SRB1, and/or SRB 2, which may be configured for other types of control messages (e.g., RRC and NAS messages). Although described with reference to a single SRB, there may be one or more SRBs configured for SIB/paging messages (e.g., there may be one or more SRBs for relaying SIB, one or more SRBs for relaying paging messages, or both). If there are different SRBs for relaying SIBs and paging messages, the different SRBs may have different priority levels. The priority level for SRB$_{RELAY}$ may be preconfigured at UE 115-c, autonomously determined by UE 115-c, or dynamically configured by base station 105-b (e.g., via upper layer signaling, such as RRC signaling).

Although described separately, aspects of the priority level techniques described herein may be combined.

At 310, base station 105-b may indicate the priority level to UE 115-c. For example, base station 105-b may transmit a message that configures the UE 115-c with the priority level. In some examples, the message may be an upper layer message, such as an RRC message. In some examples, the message may include a field that indicates the priority level. Thus, base station 105-b may send a priority level configuration to UE 115-c. In some examples, the message (or a different message) may indicate the set of transmission occasions determined for UE 115-c. Thus, the base station 105-b may configure UE 115-c with a set of defined times (e.g., transmission occasions) for relaying SIB/paging information.

At 315, base station 105-b may transmit a SIB/paging message to UE 115-c, where the SIB/paging message may be a SIB, a paging message, or both. At 320, UE 115-c may determine a priority level associated with relaying the SIB/paging message over a sidelink channel. In some examples, UE 115-c may determine the priority level based on the priority level configuration received at 310. Alternatively, UE 115-c may determine the priority level autonomously (e.g., independent of a priority level configuration from base station 105-b).

At 325, UE 115-c may indicate to UE 115-d the priority level associated with relaying the SIB/paging message. For example, UE 115-c may transmit the priority level configuration to UE 115-d over the sidelink channel. Alternatively, UE 115-c may receive the priority level configuration from base station 105-b (e.g., at 310 or later). In some examples, UE 115-c may send a control message (e.g., an SCI message) that provides control information about the SIB/paging message. For example, the SCI message may include one or more fields that indicate whether UE 115-d will receive SIB information, paging information, or both, in an upcoming transmission from UE 115-c. In some examples, the SCI may schedule or otherwise indicate the upcoming transmission that includes the SIB/paging message.

At 330, UE 115-d may determine the priority level associated with relaying the SIB/paging message. UE 115-d may determine the priority level based on the priority level configuration received from UE 115-c or base station 105-b. UE 115-d may monitor for the SIB/paging message based on the priority level.

At 335, UE 115-c may perform a channel access procedure to reserve resources of the sidelink channel for relaying the SIB/paging message. UE 115-c may perform the channel access within defined windows (e.g., transmission occasions) configured by base station 105-b or at other times determined by UE 115-c. Performing the channel access procedure based on the priority level may include setting one or more channel access parameters based on the priority level, prioritizing channel access for the SIB/paging message over (or under) channel access for another transmission, or both, among other operations. For example, UE 115-*c* may reserve resources for the SIB/paging message before a second resource reservation for another transmission based on the determined priority level of the SIB/paging message. In some examples, UE 115-*c* may determine a priority level for the other transmission. UE 115-*b* may compare the determined priority level of the SIB/paging message and the determined priority level of the other transmission to determine (e.g., based on the comparison) which transmission may be reserved first. In some examples, UE 115-*c* may send control information (e.g., in an SCI message) to UE 115-*d* indicating the resources reserved for the SIB/paging message.

At 340, UE 115-*d* may determine a set of resources for receiving the SIB/paging message from UE 115-*c*. UE 115-*d* may determine the set of resources based on the priority level associated with the SIB/paging message, based on control information (e.g., in an SCI message) from UE 115-*c*, based on control information (e.g., a transmission occasion configuration) from base station 105-*c*, or both.

At 345, UE 115-*c* may use the priority level to resolve a conflict between the transmission of the SIB/paging message and transmission or reception of another message. For example, UE 115-*c* may determine that transmission of the SIB/paging message at least partially overlaps in time, frequency, or both, with transmission (or reception) of another message. In such a scenario, UE 115-*c* may resolve the conflict by implementing power scaling based on the priority level, by delaying or canceling one of the transmissions based on the priority level, or both.

If UE 115-*c* uses power scaling to resolve the conflict, UE 115-*c* may determine a power scaling value for the SIB/paging message transmission, a power scaling value for the conflicting transmission, or both. A power scaling value may be a value used to adjust the power of a transmission or reception (e.g., the power of a transmit beam or a receive beam). UE 115-*c* may determine the power scaling value(s) based on the priority level associated with the SIB/paging message, based on the priority level associated with the conflicting transmission, or both. For example, if the priority level associated with the SIB/paging message is higher than the priority level for the conflicting transmission (as determined by a comparison), UE 115-*c* may select a first power scaling value that increases the transmit power for the SIB/paging message, a second power scaling value that decreases the transmit power for the conflicting transmission, or both. If the priority level associated with the SIB/paging message is lower than the priority level for the conflicting transmission (as determined by a comparison), UE 115-*c* may select a first power scaling value that decreases the transmit power for the SIB/paging message, a second power scaling value that increases the transmit power for the conflicting transmission, or both.

Alternatively, UE 115-*c* may resolve the conflict by canceling one of the conflicting transmissions or delaying (e.g., rescheduling) one of the conflicting transmissions. For example, if the priority level associated with the SIB/paging message is higher than the priority level for the conflicting transmission (as determined by a comparison), UE 115-*c* may transmit the SIB/paging message as scheduled and may cancel or delay transmission of the conflicting transmission. If the priority level associated with the SIB/paging message is lower than the priority level for the conflicting transmission (as determined by a comparison), UE 115-*c* may cancel or delay the SIB/paging message transmission and may proceed with the conflicting transmission as scheduled.

At 350, UE 115-*c* may transmit the SIB/paging message to UE 115-*d*. UE 115-*c* may transmit the SIB/paging message using resources scheduled by base station 105-*b*, using resources determined at 335, or using resources determined at 345. In some examples (e.g., when there is a conflict), UE 115-*c* may transmit the SIB/paging according to the conflict resolution technique determined at 345. If there is a conflict at UE 115-*d*, UE 115-*d* may resolve the conflict based on the priority level and using techniques similar to those described with reference to UE 115-*c*. For example, UE 115-*d* may cancel, reschedule, or perform power scaling for the SIB/paging message or the conflicting message based on the relative priority levels of the messages. In some examples, the SIB/paging message may be associated with $SRB_{RELAY}$, which may be configured for SIB/paging information (or, in some examples, configured for relaying SIB/paging information). $SRB_{RELAY}$ may be prioritized over or under other SRBs supported by UE 115-*c*.

Thus, UE 115-*c* may relay the SIB/paging message based on the priority level associated with the SIB/paging message, which may improve system performance. As described herein, the priority level associated with the SIB/paging message may be hardcoded, configured by base station 105-*a*, or set by UE 115-*c*.

Alternative examples of the foregoing may be implemented, where some operations are performed in a different order than described, are performed in parallel, or are not performed at all. In some cases, operations may include additional features not mentioned herein, or further operations may be added. Additionally, certain operations may be performed multiple times or certain combinations of operations may repeat or cycle.

Figure 4:
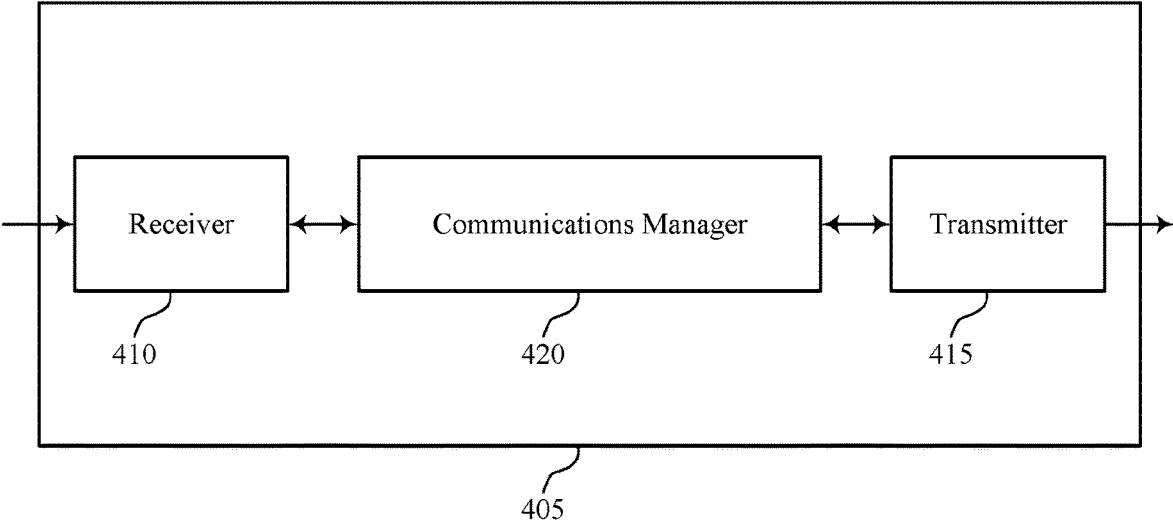
FIGS. 4 and 5 show block diagrams of devices that support system information block and paging transmission priority for sidelink relaying in accordance with aspects of the present disclosure.

FIG. 4 shows a block diagram 400 of a device 405 that supports system information block and paging transmission priority for sidelink relaying in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to system information block and paging transmission priority for sidelink relaying). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to size-based neural network selection for autoencoder-based communication). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of system information block and paging transmission priority for sidelink relaying as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-pro-grammable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a first UE in accordance with examples as disclosed herein. For example, the communications manager 420 may be configured as or otherwise support a means for receiving, from a base station, a system information block, a paging message, or both. The communications manager 420 may be configured as or otherwise support a means for determining a priority level associated with relaying the system information block, the paging message, or both on a sidelink channel. The communications manager 420 may be configured as or otherwise support a means for transmitting, to a second UE on the sidelink channel, the system information block, the paging message, or both based on the priority level.

Additionally or alternatively, the communications manager 420 may support wireless communications at a first UE in accordance with examples as disclosed herein. For example, the communications manager 420 may be configured as or otherwise support a means for determining a priority level associated with relaying a system information block, a paging message, or both on a sidelink channel. The communications manager 420 may be configured as or otherwise support a means for determining a set of one or more resources for receiving the system information block, the paging message, or both based on the priority level. The communications manager 420 may be configured as or otherwise support a means for receiving, from a second UE on the sidelink channel, the system information block, the paging message, or both in the determined set of one or more resources.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for improved communication reliability and more efficient utilization of communication resources.

Figure 5:
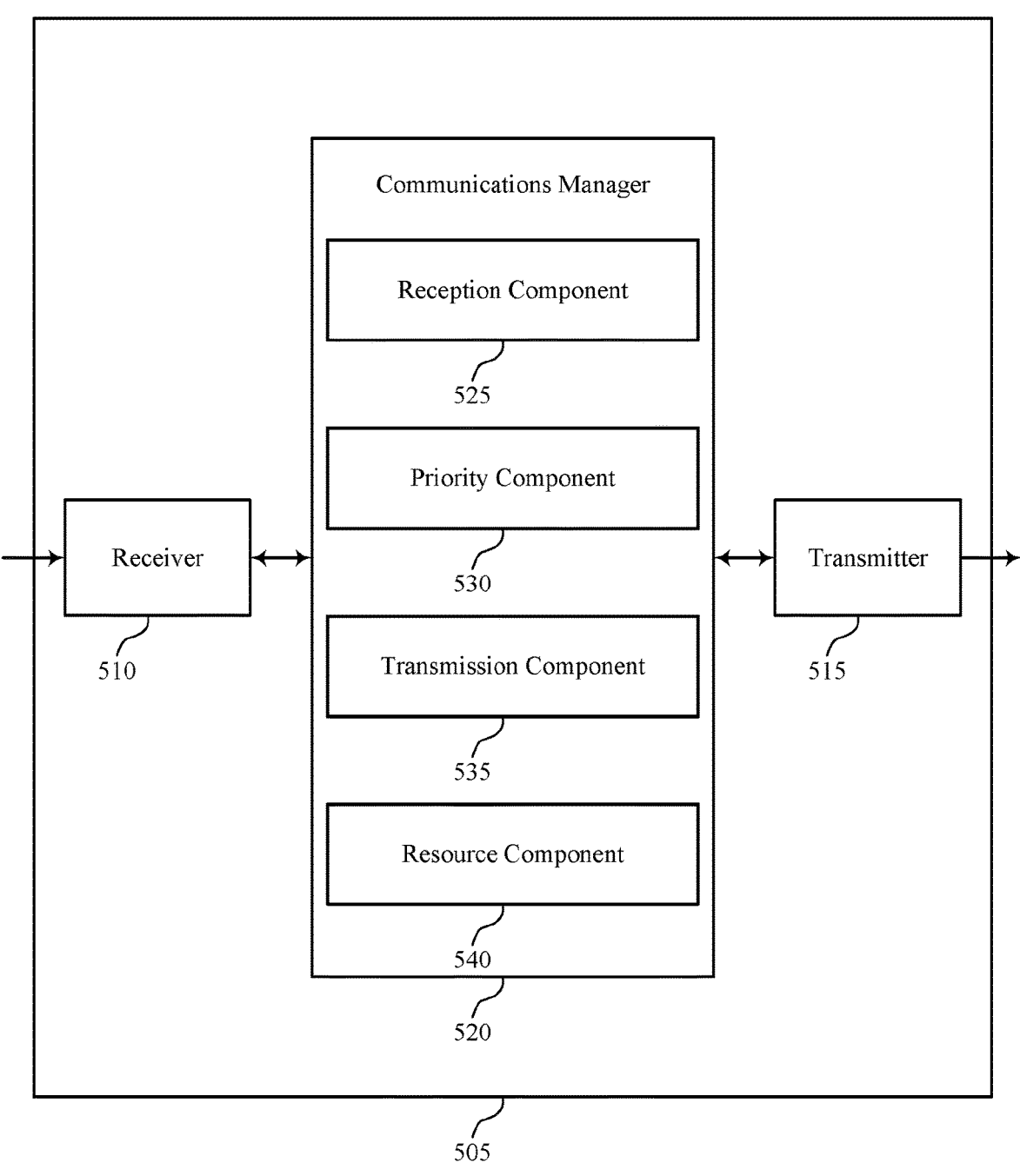

FIG. 5 shows a block diagram 500 of a device 505 that supports system information block and paging transmission priority for sidelink relaying in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to system information block and paging transmission priority for sidelink relaying). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to size-based neural network selection for autoencoder-based communication). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of system information block and paging transmission priority for sidelink relaying as described herein. For example, the communications manager 520 may include a reception component 525, a priority component 530, a transmission component 535, a resource component 540, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a first UE in accordance with examples as disclosed herein. The reception component 525 may be configured as or otherwise support a means for receiving, from a base station, a system information block, a paging message, or both. The priority component 530 may be configured as or otherwise support a means for determining a priority level associated with relaying the system information block, the paging message, or both on a sidelink channel. The transmission component 535 may be configured as or otherwise support a means for transmitting, to a second UE on the sidelink channel, the system information block, the paging message, or both based on the priority level.

Additionally or alternatively, the communications manager 520 may support wireless communications at a first UE in accordance with examples as disclosed herein. The priority component 530 may be configured as or otherwise support a means for determining a priority level associated with relaying a system information block, a paging message, or both on a sidelink channel. The resource component 540 may be configured as or otherwise support a means for determining a set of one or more resources for receiving the system information block, the paging message, or both based on the priority level. The reception component 525 may be configured as or otherwise support a means for receiving, from a second UE on the sidelink channel, the system information block, the paging message, or both in the determined set of one or more resources.

Figure 6:
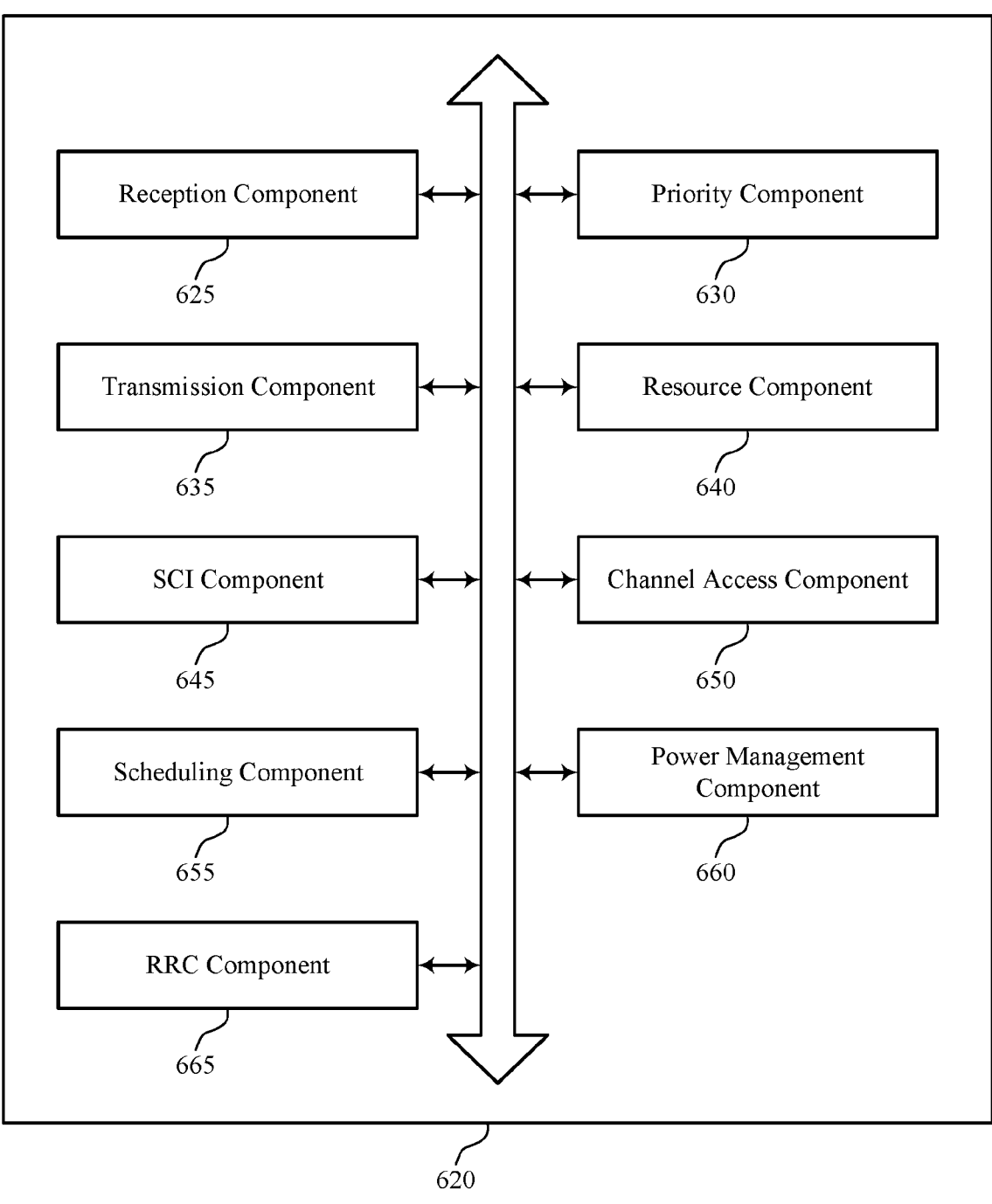
FIG. 6 shows a block diagram of a communications manager that supports system information block and paging transmission priority for sidelink relaying in accordance with aspects of the present disclosure.

FIG. 6 shows a block diagram 600 of a communications manager 620 that supports system information block and paging transmission priority for sidelink relaying in accordance with aspects of the present disclosure. The communications manager 620 may be an example of aspects of a communications manager 420, a communications manager 520, or both, as described herein. The communications manager 620, or various components thereof, may be an example of means for performing various aspects of system information block and paging transmission priority for sidelink relaying as described herein. For example, the communications manager 620 may include a reception component 625, a priority component 630, a transmission component 635, a resource component 640, an SCI component 645, a channel access component 650, a scheduling component 655, a power management component 660, an RRC component 665, or any combination thereof. Each of these components may communicate, directly or indirectly, with one another (e.g., via one or more buses).

The communications manager 620 may support wireless communications at a first UE in accordance with examples as disclosed herein. The reception component 625 may be configured as or otherwise support a means for receiving, from a base station, a system information block, a paging message, or both. The priority component 630 may be configured as or otherwise support a means for determining a priority level associated with relaying the system information block, the paging message, or both on a sidelink channel. The transmission component 635 may be configured as or otherwise support a means for transmitting, to a second UE on the sidelink channel, the system information block, the paging message, or both based on the priority level.

In some examples, the priority level is for an SRB configured for system information, paging messages, or both. In some examples, the system information, the paging message, or both are associated with the SRB. In some examples, the priority level for the SRB is higher than a priority level for a second SRB and lower than a priority level for a third SRB. In some examples, the second SRB is configured for unicast RRC messages communicated over an interface between the first UE and the second UE and the third SRB is configured for NAS messages or other types of radio resource control messages. In some examples, the second SRB is sidelink SRB3 and the third SRB is sidelink SRB0, sidelink SRB1, or sidelink SRB2. In some examples, the SRB, second SRB, and third SRB are sidelink SRBs. In some examples, the RRC component 665 may be configured as or otherwise support a means for receiving an indication of the priority level for the SRB in a radio resource control message.

In some examples, the SCI component 645 may be configured as or otherwise support a means for transmitting, to the second UE on the sidelink channel, a sidelink control information message indicating a set of one or more resources for the second UE to receive a message including the system information block, the paging message, or both, where the sidelink control information message includes a field indicating that the message corresponds to system information, paging information, or both.

In some examples, the resource component 640 may be configured as or otherwise support a means for determining a defined set of one or more transmission occasions for relaying the system information block, the paging message, or both on the sidelink channel. In some examples, the resource component 640 may be configured as or otherwise support a means for selecting a transmission occasion of the defined set of one or more transmission occasions, where the system information block, the paging message, or both are transmitted in the selected transmission occasion.

In some examples, the RRC component 665 may be configured as or otherwise support a means for receiving, from the base station, a radio resource control message configuring the defined set of one or more transmission occasions.

In some examples, the channel access component 650 may be configured as or otherwise support a means for performing a channel access procedure for the sidelink channel, where the system information block, the paging message, or both are transmitted based on the channel access procedure.

In some examples, to support performing the channel access procedure, the channel access component 650 may be configured as or otherwise support a means for sensing the sidelink channel for a time duration. In some examples, to support performing the channel access procedure, the resource component 640 may be configured as or otherwise support a means for reserving a set of one or more resources on the sidelink channel based on the sensing, where the system information block, the paging message, or both are transmitted in the reserved set of one or more resources.

In some examples, the set of one or more resources is reserved based on the priority level. In some examples, the scheduling component 655 may be configured as or otherwise support a means for determining a scheduled communication on a second channel at least partially overlapping in time with the transmitting the system information block, the paging message, or both. In some examples, the power management component 660 may be configured as or otherwise support a means for determining a power scaling value based on the priority level and a second priority level for the second channel, where the system information block, the paging message, or both are transmitted based on the power scaling value.

In some examples, the scheduling component 655 may be configured as or otherwise support a means for determining a scheduled communication on a second channel at least partially overlapping in time with the transmitting the system information block, the paging message, or both. In some examples, the priority component 630 may be configured as or otherwise support a means for comparing the priority level to a second priority level for the second channel. In some examples, the transmission component 635 may be configured as or otherwise support a means for refraining from communicating the scheduled communication on the second channel based on the comparing.

In some examples, the resource component 640 may be configured as or otherwise support a means for selecting a first set of one or more resources for transmitting the system information block, the paging message, or both. In some examples, the scheduling component 655 may be configured as or otherwise support a means for determining a scheduled communication on a second channel at least partially overlapping in time with the first set of one or more resources. In some examples, the priority component 630 may be configured as or otherwise support a means for comparing the priority level to a second priority level for the second channel. In some examples, the transmission component 635 may be configured as or otherwise support a means for refraining from transmitting the system information block, the paging message, or both in the first set of one or more resources based on the comparing, where the system information block, the paging message, or both are transmitted in a second set of one or more resources based on the comparing.

In some examples, the RRC component 665 may be configured as or otherwise support a means for receiving, from the base station, a radio resource control message configuring the priority level associated with relaying the system information block, the paging message, or both on the sidelink channel.

In some examples, the SCI component 645 may be configured as or otherwise support a means for transmitting, to the second UE on the sidelink channel, a message indicating the priority level associated with relaying the system information block, the paging message, or both on the sidelink channel.

In some examples, the priority level includes a lowest transmission priority. In some examples, the priority level includes a highest transmission priority. In some examples, the priority level includes a first priority index value, and the priority component 630 may be configured as or otherwise support a means for comparing the first priority index value to at least a second priority index value for a second channel, where the system information block, the paging message, or both are transmitted based on the comparing.

In some examples, the system information block, the paging message, or both includes the paging message and, to support determining the priority level, the priority component 630 may be configured as or otherwise support a means for determining the priority level based on whether the paging message is for a common system information block, a dedicated system information block, dedicated data, or a combination thereof. In some examples, the paging message is for dedicated data. In some examples, the priority level is set to a priority level of the dedicated data.

In some examples, the system information block, the paging message, or both includes the system information block and, to support determining the priority level, the priority component 630 may be configured as or otherwise support a means for determining the priority level based on a broadcast status of the system information block, whether the system information block includes a cell-specific update or an area-specific update, a type of the system information block, whether the system information block is periodic or on-demand, or a combination thereof.

Additionally or alternatively, the communications manager 620 may support wireless communications at a first UE in accordance with examples as disclosed herein. In some examples, the priority component 630 may be configured as or otherwise support a means for determining a priority level associated with relaying a system information block, a paging message, or both on a sidelink channel. The resource component 640 may be configured as or otherwise support a means for determining a set of one or more resources for receiving the system information block, the paging message, or both based on the priority level. In some examples, the reception component 625 may be configured as or otherwise support a means for receiving, from a second UE on the sidelink channel, the system information block, the paging message, or both in the determined set of one or more resources.

In some examples, the SCI component 645 may be configured as or otherwise support a means for receiving, from the second UE on the sidelink channel, a sidelink control information message indicating the set of one or more resources for receiving a message including the system information block, the paging message, or both, where the sidelink control information message includes a field indicating that the message corresponds to system information, paging information, or both.

In some examples, the resource component 640 may be configured as or otherwise support a means for determining a defined set of one or more transmission occasions for receiving the system information block, the paging message, or both on the sidelink channel, where the defined set of one or more transmission occasions includes the set of one or more resources. In some examples, the scheduling component 655 may be configured as or otherwise support a means for performing a wake up procedure prior to the set of one or more resources. In some examples, the resource component 640 may be configured as or otherwise support a means for monitoring the set of one or more resources for the system information block, the paging message, or both based on the defined set of one or more transmission occasions.

In some examples, the reception component 625 may be configured as or otherwise support a means for receiving, from the second UE or a base station, a message configuring the defined set of one or more transmission occasions.

In some examples, the scheduling component 655 may be configured as or otherwise support a means for determining a scheduled communication on a second channel at least partially overlapping in time with the set of one or more resources. In some examples, the power management component 660 may be configured as or otherwise support a means for determining a power scaling value based on the priority level and a second priority level for the second channel, where the system information block, the paging message, or both are received based on the power scaling value.

In some examples, the scheduling component 655 may be configured as or otherwise support a means for scheduling a communication on a second channel at least partially overlapping in time with the set of one or more resources. In some examples, the priority component 630 may be configured as or otherwise support a means for comparing the priority level to a second priority level for the second channel. In some examples, the transmission component 635 may be configured as or otherwise support a means for refraining from communicating the scheduled communication on the second channel based on the comparing.

In some examples, the reception component 625 may be configured as or otherwise support a means for receiving, from the second UE on the sidelink channel, a message configuring the priority level associated with relaying the system information block, the paging message, or both on the sidelink channel.

In some examples, the RRC component 665 may be configured as or otherwise support a means for receiving, from a base station, a radio resource control message configuring the priority level associated with relaying the system information block, the paging message, or both on the sidelink channel.

Figure 7:
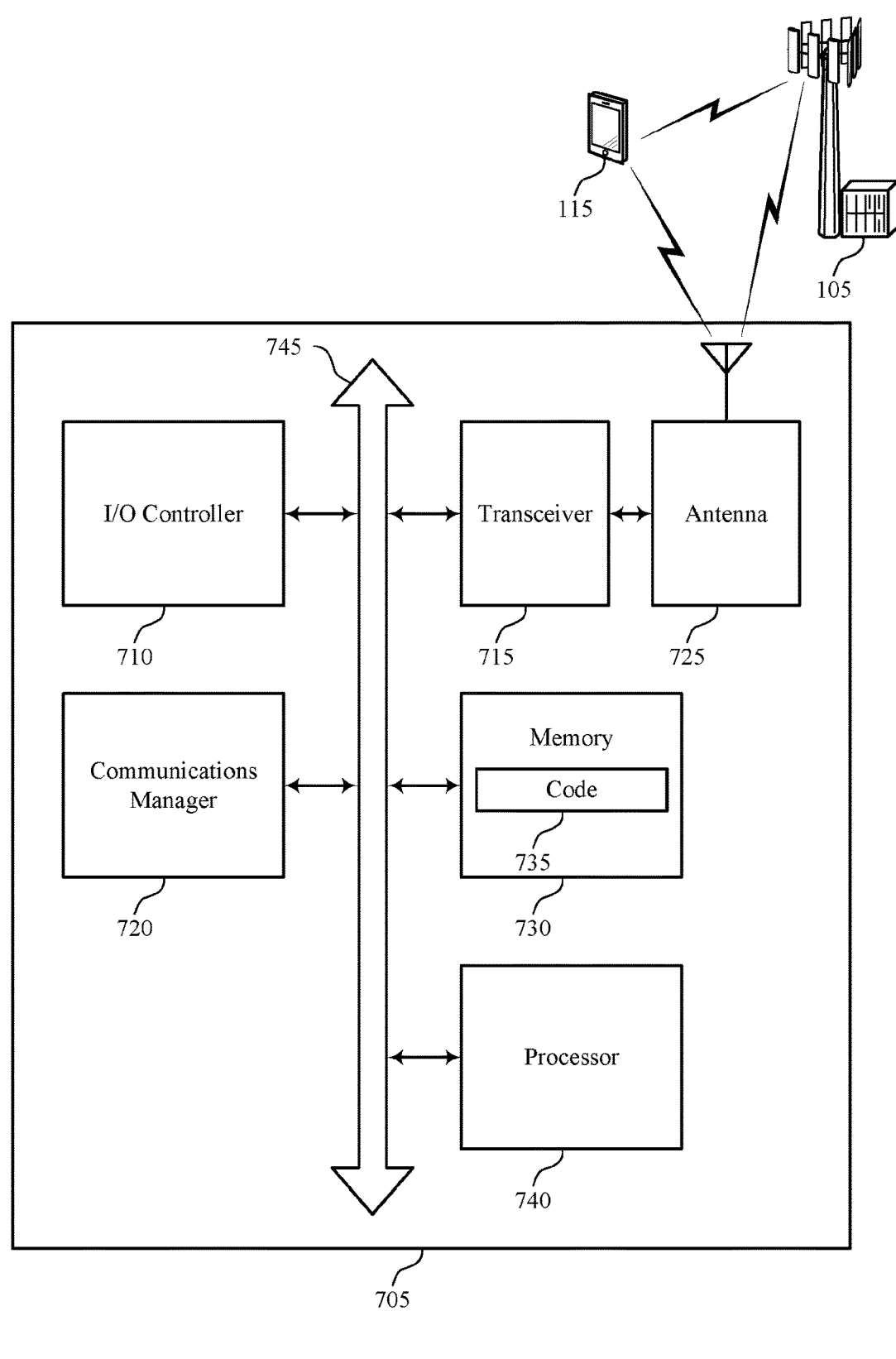
FIG. 7 shows a diagram of a system including a device that supports system information block and paging transmission priority for sidelink relaying in accordance with aspects of the present disclosure.

FIG. 7 shows a diagram of a system 700 including a device 705 that supports system information block and paging transmission priority for sidelink relaying in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In some other cases, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets and provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or other type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting system information block and paging transmission priority for sidelink relaying). For example, the device 705 or a component of the device 705 may include a processor 740 and memory 730 coupled to the processor 740, the processor 740 and memory 730 configured to perform various functions described herein.

The communications manager 720 may support wireless communications at a first UE in accordance with examples as disclosed herein. For example, the communications manager 720 may be configured as or otherwise support a means for receiving, from a base station, a system information block, a paging message, or both. The communications manager 720 may be configured as or otherwise support a means for determining a priority level associated with relaying the system information block, the paging message, or both on a sidelink channel. The communications manager 720 may be configured as or otherwise support a means for transmitting, to a second UE on the sidelink channel, the system information block, the paging message, or both based on the priority level.

Additionally or alternatively, the communications manager 720 may support wireless communications at a first UE in accordance with examples as disclosed herein. For example, the communications manager 720 may be configured as or otherwise support a means for determining a priority level associated with relaying a system information block, a paging message, or both on a sidelink channel. The communications manager 720 may be configured as or otherwise support a means for determining a set of one or more resources for receiving the system information block, the paging message, or both based on the priority level. The communications manager 720 may be configured as or otherwise support a means for receiving, from a second UE on the sidelink channel, the system information block, the paging message, or both in the determined set of one or more resources.

By including or configuring the communications manager 720 in accordance with examples as described herein, the device 705 may support techniques for improved communication reliability and more efficient utilization of communication resources.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of system information block and paging transmission priority for sidelink relaying as described herein, or the processor 740 and the memory 730 may be otherwise configured to perform or support such operations.

Figure 8:
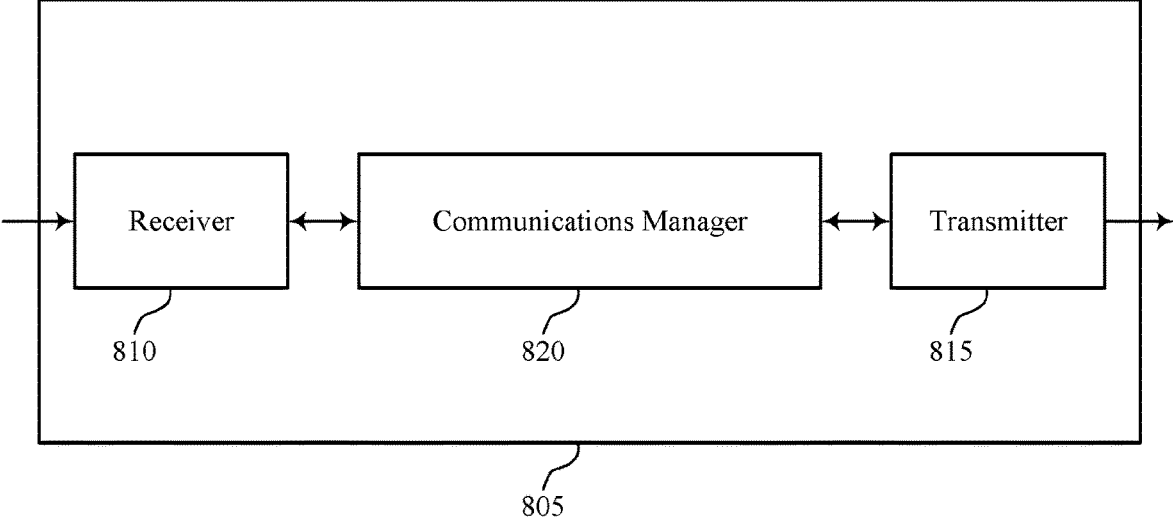
FIGS. 8 and 9 show block diagrams of devices that support system information block and paging transmission priority for sidelink relaying in accordance with aspects of the present disclosure.

FIG. 8 shows a block diagram 800 of a device 805 that supports system information block and paging transmission priority for sidelink relaying in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to system information block and paging transmission priority for sidelink relaying). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to size-based neural network selection for autoencoder-based communication). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of system information block and paging transmission priority for sidelink relaying as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a base station in accordance with examples as disclosed herein. For example, the communications manager 820 may be configured as or otherwise support a means for determining a priority level associated with relaying a system information block, a paging message, or both on a sidelink channel. The communications manager 820 may be configured as or otherwise support a means for transmitting, to a UE, a message configuring the UE with the priority level. The communications manager 820 may be configured as or otherwise support a means for transmitting, to the UE, the system information block, the paging message, or both.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for improved communication reliability and more efficient utilization of communication resources.

Figure 9:
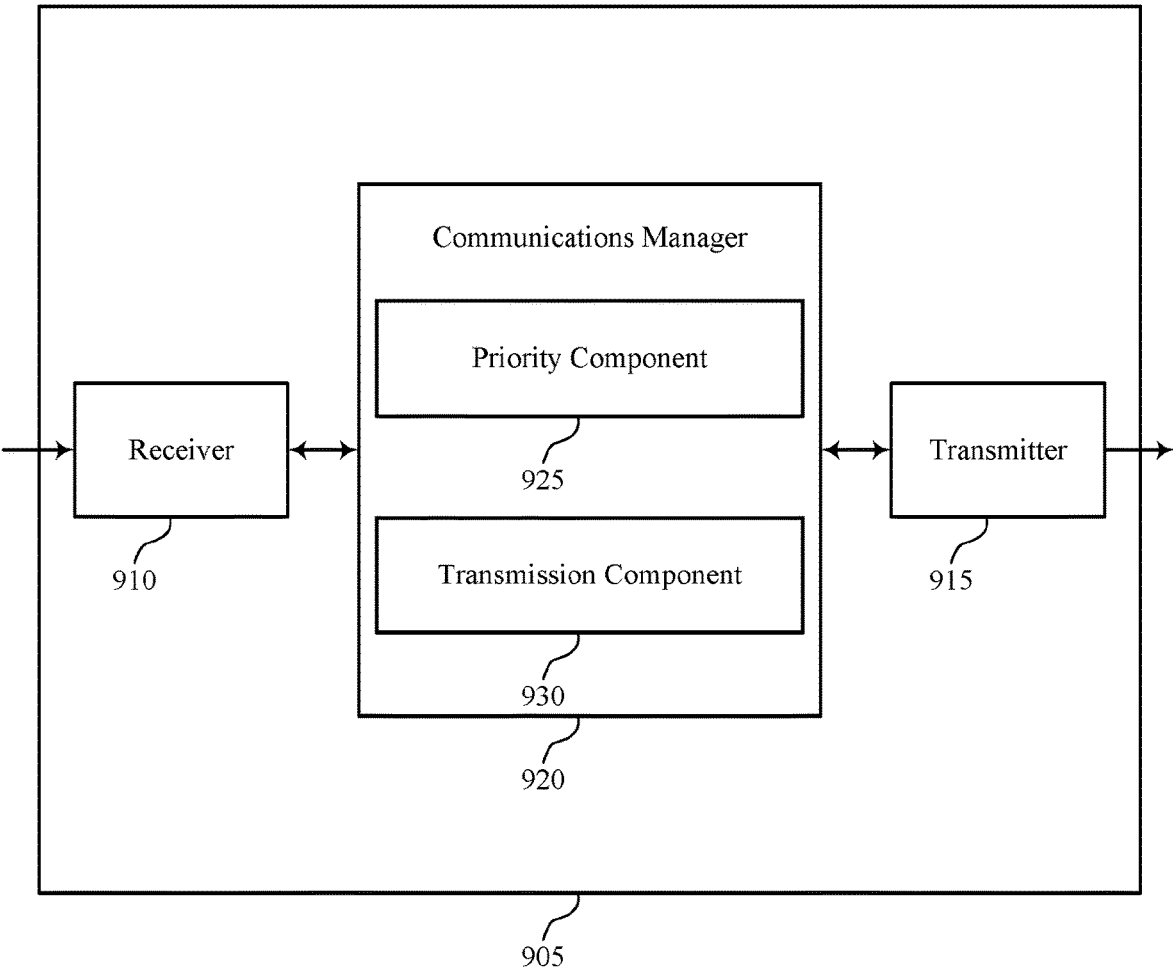

FIG. 9 shows a block diagram 900 of a device 905 that supports system information block and paging transmission priority for sidelink relaying in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to system information block and paging transmission priority for sidelink relaying). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to size-based neural network selection for autoencoder-based communication). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of system information block and paging transmission priority for sidelink relaying as described herein. For example, the communications manager 920 may include a priority component 925 a transmission component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. The priority component 925 may be configured as or otherwise support a means for determining a priority level associated with relaying a system information block, a paging message, or both on a sidelink channel. The transmission component 930 may be configured as or otherwise support a means for transmitting, to a UE, a message configuring the UE with the priority level. The transmission component 930 may be configured as or otherwise support a means for transmitting, to the UE, the system information block, the paging message, or both.

FIG. 10 shows a block diagram 1000 of a communications manager 1020 that supports system information block and paging transmission priority for sidelink relaying in accordance with aspects of the present disclosure. The communications manager 1020 may be an example of aspects of a communications manager 820, a communications manager 920, or both, as described herein. The communications manager 1020, or various components thereof, may be an example of means for performing various aspects of system information block and paging transmission priority for sidelink relaying as described herein. For example, the communications manager 1020 may include a priority component 1025, a transmission component 1030, an RRC component 1035, or any combination thereof. Each of these components may communicate, directly or indirectly, with one another (e.g., via one or more buses).

The communications manager 1020 may support wireless communications at a base station in accordance with examples as disclosed herein. The priority component 1025 may be configured as or otherwise support a means for determining a priority level associated with relaying a system information block, a paging message, or both on a sidelink channel. The transmission component 1030 may be configured as or otherwise support a means for transmitting, to a UE, a message configuring the UE with the priority level. In some examples, the transmission component 1030 may be configured as or otherwise support a means for transmitting, to the UE, the system information block, the paging message, or both.

In some examples, the priority level is for an SRB configured for system information, paging messages, or both. In some examples, the system information, the paging message, or both are associated with the SRB. In some examples, the priority level for the SRB is higher than a priority level for a second SRB and lower than a priority level for a third SRB. In some examples, the second SRB is sidelink SRB3 and the third SRB is sidelink SRB0, sidelink SRB1, or sidelink SRB2. In some examples, the SRB, second SRB, and third SRB are sidelink SRBs. In some examples, the message includes a radio resource control message including a field indicating the priority level. In some examples, the RRC component 1035 may be configured as or otherwise support a means for transmitting, to the UE, a radio resource control message configuring a defined set of one or more transmission occasions for the UE to relay the system information block, the paging message, or both on the sidelink channel.

Figure 11:
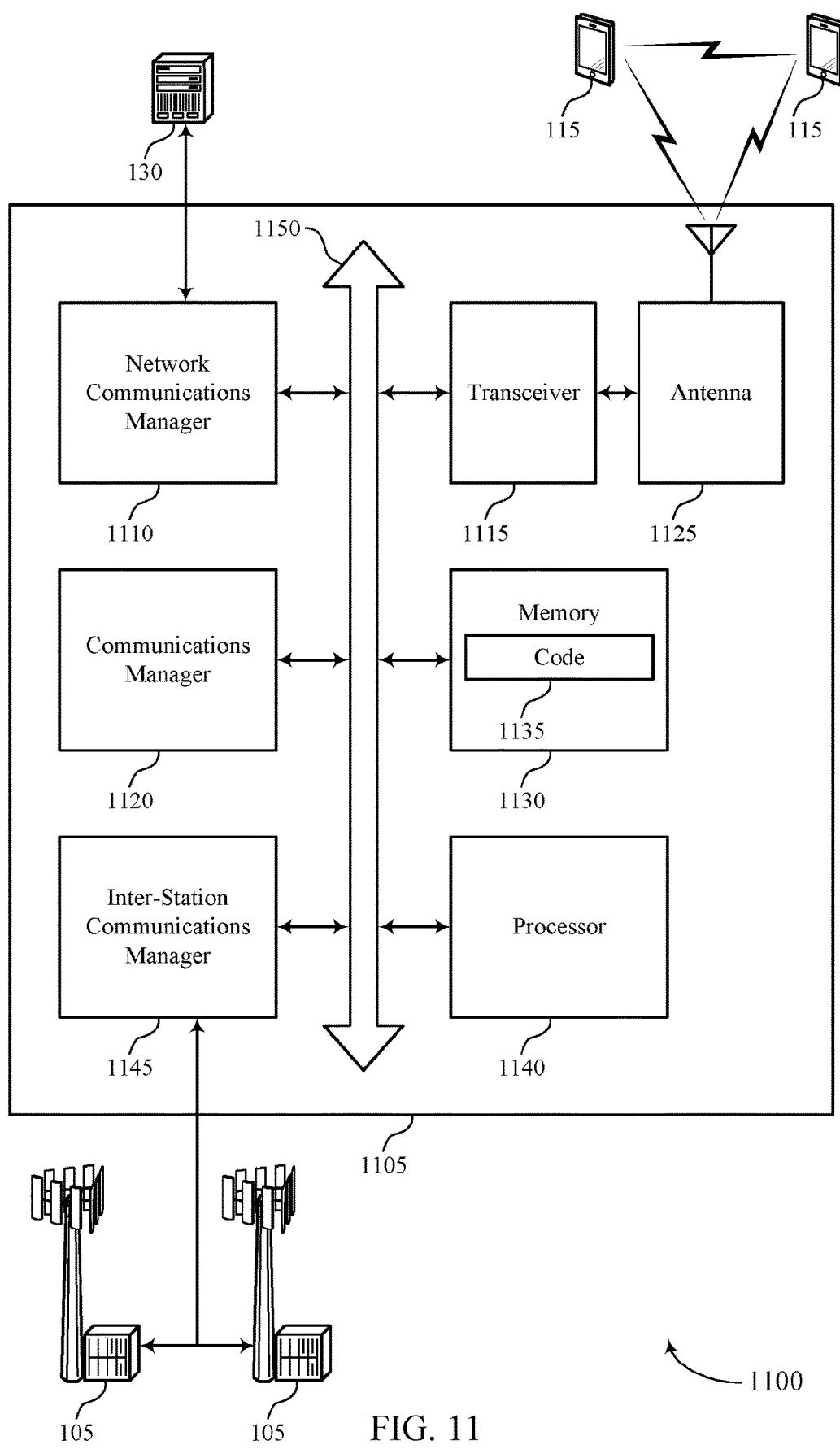
FIG. 11 shows a diagram of a system including a device that supports system information block and paging transmission priority for sidelink relaying in accordance with aspects of the present disclosure.

FIG. 11 shows a diagram of a system 1100 including a device 1105 that supports system information block and paging transmission priority for sidelink relaying in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets and provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting system information block and paging transmission priority for side-link relaying). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105 and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communications at a base station in accordance with examples as disclosed herein. For example, the communications manager 1120 may be configured as or otherwise support a means for determining a priority level associated with relaying a system information block, a paging message, or both on a sidelink channel. The communications manager 1120 may be configured as or otherwise support a means for transmitting, to a UE, a message configuring the UE with the priority level. The communications manager 1120 may be configured as or otherwise support a means for transmitting, to the UE, the system information block, the paging message, or both.

By including or configuring the communications manager 1120 in accordance with examples as described herein, the device 1105 may support techniques for improved communication reliability and more efficient utilization of communication resources.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of system information block and paging transmission priority for sidelink relaying as described herein, or the processor 1140 and the memory 1130 may be otherwise configured to perform or support such operations.

Figure 12:
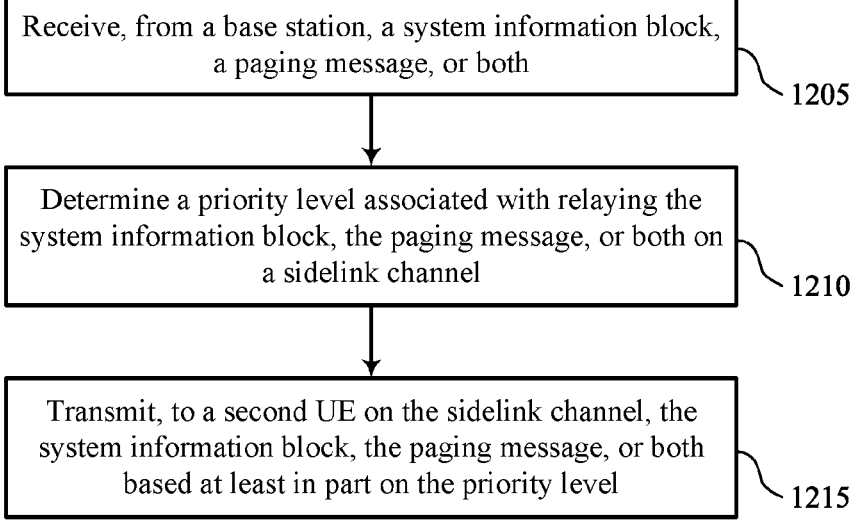

FIG. 12 shows a flowchart illustrating a method 1200 that supports system information block and paging transmission priority for sidelink relaying in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a system information block, a paging message, or both. The operations of 1205 may be performed in accordance with examples as disclosed herein. In some examples, aspects of the operations of 1205 may be performed by a reception component 625 as described with reference to FIG. 6.

At 1210, the method may include determining a priority level associated with relaying the system information block, the paging message, or both on a sidelink channel. The operations of 1210 may be performed in accordance with examples as disclosed herein. In some examples, aspects of the operations of 1210 may be performed by a priority component 630 as described with reference to FIG. 6.

At 1215, the method may include transmitting, to a second UE on the sidelink channel, the system information block, the paging message, or both based on the priority level. The operations of 1215 may be performed in accordance with examples as disclosed herein. In some examples, aspects of the operations of 1215 may be performed by a transmission component 635 as described with reference to FIG. 6.

FIG. 13 shows a flowchart illustrating a method 1300 that supports system information block and paging transmission priority for sidelink relaying in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include determining a priority level associated with relaying a system information block, a paging message, or both on a sidelink channel. The operations of 1305 may be performed in accordance with examples as disclosed herein. In some examples, aspects of the operations of 1305 may be performed by a priority component 630 as described with reference to FIG. 6.

At 1310, the method may include determining a set of one or more resources for receiving the system information block, the paging message, or both based on the priority level. The operations of 1310 may be performed in accordance with examples as disclosed herein. In some examples, aspects of the operations of 1310 may be performed by a resource component 640 as described with reference to FIG. 6.

At 1315, the method may include receiving, from a second UE on the sidelink channel, the system information block, the paging message, or both in the determined set of one or more resources. The operations of 1315 may be performed in accordance with examples as disclosed herein. In some examples, aspects of the operations of 1315 may be performed by a reception component 625 as described with reference to FIG. 6.

Figure 14:
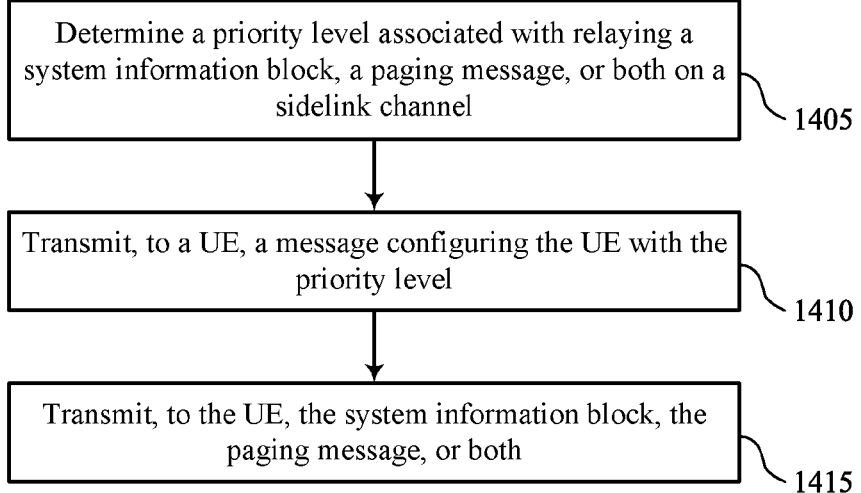

FIG. 14 shows a flowchart illustrating a method 1400 that supports system information block and paging transmission priority for sidelink relaying in accordance with aspects of the present disclosure. The operations of the method 1400 may be implemented by a base station or its components as described herein. For example, the operations of the method 1400 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1405, the method may include determining a priority level associated with relaying a system information block, a paging message, or both on a sidelink channel. The operations of 1405 may be performed in accordance with examples as disclosed herein. In some examples, aspects of the operations of 1405 may be performed by a priority component 1025 as described with reference to FIG. 10.

At 1410, the method may include transmitting, to a UE, a message configuring the UE with the priority level. The operations of 1410 may be performed in accordance with examples as disclosed herein. In some examples, aspects of the operations of 1410 may be performed by a transmission component 1030 as described with reference to FIG. 10.

At 1415, the method may include transmitting, to the UE, the system information block, the paging message, or both. The operations of 1415 may be performed in accordance with examples as disclosed herein. In some examples, aspects of the operations of 1415 may be performed by a transmission component 1030 as described with reference to FIG. 10.

The following provides an overview of aspects of the present disclosure:

Aspect 1: A method for wireless communications at a first UE, comprising: receiving, from a base station, a system information block, a paging message, or both; determining a priority level associated with relaying the system information block, the paging message, or both on a sidelink channel; and transmitting, to a second UE on the sidelink channel, the system information block, the paging message, or both based at least in part on the priority level.

Aspect 2: The method of aspect 1, wherein the priority level is for an SRB configured for system information, paging messages, or both, and the system information, the paging message, or both are associated with the SRB.

Aspect 3: The method of aspect 2, wherein the priority level for the SRB is higher than a priority level for a second SRB and lower than a priority level for a third SRB.

Aspect 4: The method of aspect 3, wherein the second SRB is configured for unicast RRC messages communicated over an interface between the first UE and the second UE and the third SRB is configured for NAS messages or other types of radio resource control messages.

Aspect 5: The method of any of aspects 3 through 4, wherein the second SRB is sidelink SRB3 and the third SRB is sidelink SRB0, sidelink SRB1, or sidelink SRB2.

Aspect 6: The method of any of aspects 2 through 5, further comprising: receiving an indication of the priority level for the SRB in a radio resource control message.

Aspect 7: The method of any of aspects 1 through 6, further comprising: transmitting, to the second UE on the sidelink channel, a sidelink control information message indicating a set of one or more resources for the second UE to receive a message comprising the system information block, the paging message, or both, wherein the sidelink control information message comprises a field indicating that the message corresponds to system information, paging information, or both.

Aspect 8: The method of any of aspects 1 through 7, further comprising: determining a defined set of one or more transmission occasions for relaying the system information block, the paging message, or both on the sidelink channel; and selecting a transmission occasion of the defined set of one or more transmission occasions, wherein the system information block, the paging message, or both are transmitted in the selected transmission occasion.

Aspect 9: The method of aspect 8, further comprising: receiving, from the base station, a radio resource control message configuring the defined set of one or more transmission occasions.

Aspect 10: The method of any of aspects 1 through 9, further comprising: performing a channel access procedure for the sidelink channel, wherein the system information block, the paging message, or both are transmitted based at least in part on the channel access procedure.

Aspect 11: The method of aspect 10, wherein performing the channel access procedure comprises: sensing the sidelink channel for a time duration; and reserving a set of one or more resources on the sidelink channel based at least in part on the sensing, wherein the system information block, the paging message, or both are transmitted in the reserved set of one or more resources.

Aspect 12: The method of aspect 11, wherein the set of one or more resources is reserved based at least in part on the priority level.

Aspect 13: The method of any of aspects 1 through 12, further comprising: determining a scheduled communication on a second channel at least partially overlapping in time with the transmitting the system information block, the paging message, or both; and determining a power scaling value based at least in part on the priority level and a second priority level for the second channel, wherein the system information block, the paging message, or both are transmitted based at least in part on the power scaling value.

Aspect 14: The method of any of aspects 1 through 12, further comprising: determining a scheduled communication on a second channel at least partially overlapping in time with the transmitting the system information block, the paging message, or both; comparing the priority level to a second priority level for the second channel; and refraining from communicating the scheduled communication on the second channel based at least in part on the comparing.

Aspect 15: The method of any of aspects 1 through 14, further comprising: selecting a first set of one or more resources for transmitting the system information block, the paging message, or both; determining a scheduled communication on a second channel at least partially overlapping in time with the first set of one or more resources; comparing the priority level to a second priority level for the second channel; and refraining from transmitting the system information block, the paging message, or both in the first set of one or more resources based at least in part on the comparing, wherein the system information block, the paging message, or both are transmitted in a second set of one or more resources based at least in part on the comparing.

Aspect 16: The method of any of aspects 1 through 15, further comprising: receiving, from the base station, a radio resource control message configuring the priority level associated with relaying the system information block, the paging message, or both on the sidelink channel.

Aspect 17: The method of any of aspects 1 through 16, further comprising: transmitting, to the second UE on the sidelink channel, a message indicating the priority level associated with relaying the system information block, the paging message, or both on the sidelink channel.

Aspect 18: The method of any of aspects 1 through 17, wherein the priority level comprises a lowest transmission priority.

Aspect 19: The method of any of aspects 1 through 17, wherein the priority level comprises a highest transmission priority.

Aspect 20: The method of any of aspects 1 through 19, wherein the priority level comprises a first priority index value, the method further comprising: comparing the first priority index value to at least a second priority index value for a second channel, wherein the system information block, the paging message, or both are transmitted based at least in part on the comparing.

Aspect 21: The method of any of aspects 1 through 20, wherein the system information block, the paging message, or both comprises the paging message and determining the priority level comprises: determining the priority level based at least in part on whether the paging message is for a common system information block, a dedicated system information block, dedicated data, or a combination thereof.

Aspect 22: The method of aspect 21, wherein the paging message is for dedicated data; and the priority level is set to a priority level of the dedicated data.

Aspect 23: The method of any of aspects 1 through 22, wherein the system information block, the paging message, or both comprises the system information block and determining the priority level comprises: determining the priority level based at least in part on a broadcast status of the system information block, whether the system information block comprises a cell-specific update or an area-specific update, a type of the system information block, whether the system information block is periodic or on-demand, or a combination thereof.

Aspect 24: A method for wireless communications at a first UE, comprising: determining a priority level associated with relaying a system information block, a paging message, or both on a sidelink channel; determining a set of one or more resources for receiving the system information block, the paging message, or both based at least in part on the priority level; and receiving, from a second UE on the sidelink channel, the system information block, the paging message, or both in the determined set of one or more resources.

Aspect 25: The method of aspect 24, further comprising: receiving, from the second UE on the sidelink channel, a sidelink control information message indicating the set of one or more resources for receiving a message comprising the system information block, the paging message, or both, wherein the sidelink control information message comprises a field indicating that the message corresponds to system information, paging information, or both.

Aspect 26: The method of any of aspects 24 through 25, further comprising: determining a defined set of one or more transmission occasions for receiving the system information block, the paging message, or both on the sidelink channel, wherein the defined set of one or more transmission occasions comprises the set of one or more resources; performing a wake up procedure prior to the set of one or more resources; and monitoring the set of one or more resources for the system information block, the paging message, or both based at least in part on the defined set of one or more transmission occasions.

Aspect 27: The method of aspect 26, further comprising: receiving, from the second UE or a base station, a message configuring the defined set of one or more transmission occasions.

Aspect 28: The method of any of aspects 24 through 27, further comprising: determining a scheduled communication on a second channel at least partially overlapping in time with the set of one or more resources; and determining a power scaling value based at least in part on the priority level and a second priority level for the second channel, wherein the system information block, the paging message, or both are received based at least in part on the power scaling value.

Aspect 29: The method of any of aspects 24 through 28, further comprising: scheduling a communication on a second channel at least partially overlapping in time with the set of one or more resources; comparing the priority level to a second priority level for the second channel; and refraining from communicating the scheduled communication on the second channel based at least in part on the comparing.

Aspect 30: The method of any of aspects 24 through 29, further comprising: receiving, from the second UE on the sidelink channel, a message configuring the priority level associated with relaying the system information block, the paging message, or both on the sidelink channel.

Aspect 31: The method of any of aspects 24 through 30, further comprising: receiving, from a base station, a radio resource control message configuring the priority level associated with relaying the system information block, the paging message, or both on the sidelink channel.

Aspect 32: A method for wireless communications at a base station, comprising: determining a priority level associated with relaying a system information block, a paging message, or both on a sidelink channel; transmitting, to a UE, a message configuring the UE with the priority level; and transmitting, to the UE, the system information block, the paging message, or both.

Aspect 33: The method of aspect 32, wherein the priority level is for an SRB configured for system information, paging messages, or both, and the system information, the paging message, or both are associated with the SRB.

Aspect 34: The method of aspect 33, wherein the priority level for the SRB is higher than a priority level for a second SRB and lower than a priority level for a third SRB.

Aspect 35: The method of any of aspects 32 through 34, wherein the message comprises a radio resource control message comprising a field indicating the priority level.

Aspect 36: The method of any of aspects 32 through 35, further comprising: transmitting, to the UE, a radio resource control message configuring a defined set of one or more transmission occasions for the UE to relay the system information block, the paging message, or both on the sidelink channel.

Aspect 37: An apparatus for wireless communications at a first UE, comprising a processor; memory coupled with the processor; and instructions stored in the memory and executable by the processor to cause the apparatus to perform a method of any of aspects 1 through 23.

Aspect 38: An apparatus for wireless communications at a first UE, comprising at least one means for performing a method of any of aspects 1 through 23.

Aspect 39: A non-transitory computer-readable medium storing code for wireless communications at a first UE, the code comprising instructions executable by a processor to perform a method of any of aspects 1 through 23.

Aspect 40: An apparatus for wireless communications at a first UE, comprising a processor; memory coupled with the processor; and instructions stored in the memory and executable by the processor to cause the apparatus to perform a method of any of aspects 24 through 31.

Aspect 41: An apparatus for wireless communications at a first UE, comprising at least one means for performing a method of any of aspects 24 through 31.

Aspect 42: A non-transitory computer-readable medium storing code for wireless communications at a first UE, the code comprising instructions executable by a processor to perform a method of any of aspects 24 through 31.

Aspect 43: An apparatus for wireless communications at a base station, comprising a processor; memory coupled with the processor; and instructions stored in the memory and executable by the processor to cause the apparatus to perform a method of any of aspects 32 through 36.

Aspect 44: An apparatus for wireless communications at a base station, comprising at least one means for performing a method of any of aspects 32 through 36.

Aspect 45: A non-transitory computer-readable medium storing code for wireless communications at a base station, the code comprising instructions executable by a processor to perform a method of any of aspects 32 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
a processor, memory coupled with the processor; and
instructions stored in the memory and executable by the processor to cause the apparatus to:
receive, from a base station, a system information block, a paging message, or both, wherein a signaling radio bearer (SRB) is configured for the system information block, the paging message, or both;
determine a priority level associated with relaying the system information block, the paging message, or both on a sidelink channel, wherein the priority level is for the SRB configured for system information, paging messages, or both, wherein a second priority level is for a second SRB that is configured for unicast radio resource control messages communicated over an interface between the first UE and a second UE, and wherein a third priority level is for a third SRB that is configured for non-access stratum messages or other types of radio resource control messages; and
transmit, to the second UE on the sidelink channel, the system information block, the paging message, or both based at least in part on the priority level, the second priority level, and the third priority level.

2. The apparatus of claim 1, wherein the priority level for the SRB is higher than the second priority level for the second SRB and lower than the third priority level for the third SRB.

3. The apparatus of claim 2, wherein the second SRB is sidelink SRB3 and the third SRB is sidelink SRB0, sidelink SRB1, or sidelink SRB2.

4. The apparatus of claim 1, wherein the instructions are further executable by the processor to cause the apparatus to:

receive an indication of the priority level for the SRB in a radio resource control message.

5. The apparatus of claim 1, wherein the instructions are further executable by the processor to cause the apparatus to:
transmit, to the second UE on the sidelink channel, a sidelink control information message indicating a set of one or more resources for the second UE to receive a message comprising the system information block, the paging message, or both, wherein the sidelink control information message comprises a field indicating that the message corresponds to system information, paging information, or both.

6. The apparatus of claim 1, wherein the instructions are further executable by the processor to cause the apparatus to:
determine a defined set of one or more transmission occasions for relaying the system information block, the paging message, or both on the sidelink channel; and
select a transmission occasion of the defined set of one or more transmission occasions, wherein the system information block, the paging message, or both are transmitted in the selected transmission occasion.

7. The apparatus of claim 1, wherein the instructions are further executable by the processor to cause the apparatus to:
perform a channel access procedure for the sidelink channel, wherein the system information block, the paging message, or both are transmitted based at least in part on the channel access procedure.

8. The apparatus of claim 7, wherein the instructions to perform the channel access procedure are executable by the processor to cause the apparatus to:
sense the sidelink channel for a time duration; and
reserve a set of one or more resources on the sidelink channel based at least in part on the sensing and the priority level, wherein the system information block, the paging message, or both are transmitted in the reserved set of one or more resources.

9. The apparatus of claim 1, wherein the instructions are further executable by the processor to cause the apparatus to:
determine a scheduled communication on a second channel at least partially overlapping in time with the transmitting the system information block, the paging message, or both; and
determine a power scaling value based at least in part on the priority level and a priority level for the second channel, wherein the system information block, the paging message, or both are transmitted based at least in part on the power scaling value.

10. The apparatus of claim 1, wherein the instructions are further executable by the processor to cause the apparatus to:
determine a scheduled communication on a second channel at least partially overlapping in time with the transmitting the system information block, the paging message, or both;

compare the priority level to a priority level for the second channel; and refrain from communicating the scheduled communication on the second channel based at least in part on the comparing.

11. The apparatus of claim 1, wherein the instructions are further executable by the processor to cause the apparatus to:

select a first set of one or more resources for transmitting the system information block, the paging message, or both;

determine a scheduled communication on a second channel at least partially overlapping in time with the first set of one or more resources;

compare the priority level to a priority level for the second channel; and refrain from transmitting the system information block, the paging message, or both in the first set of one or more resources based at least in part on the comparing, wherein the system information block, the paging message, or both are transmitted in a second set of one or more resources based at least in part on the comparing.

12. The apparatus of claim 1, wherein the instructions are further executable by the processor to cause the apparatus to:

receive, from the base station, a radio resource control message configuring the priority level associated with relaying the system information block, the paging message, or both on the sidelink channel.

13. The apparatus of claim 1, wherein the priority level comprises a lowest transmission priority or a highest transmission priority.

14. The apparatus of claim 1, wherein the priority level comprises a first priority index value, and the instructions are further executable by the processor to cause the apparatus to:

compare the first priority index value to at least a second priority index value for a second channel, wherein the system information block, the paging message, or both are transmitted based at least in part on the comparing.

15. The apparatus of claim 1, wherein the system information block, the paging message, or both comprises the paging message and the instructions to determine the priority level are executable by the processor to cause the apparatus to:

determine the priority level based at least in part on whether the paging message is for a common system information block, a dedicated system information block, dedicated data, or a combination thereof.

16. The apparatus of claim 15, wherein the paging message is for dedicated data, and wherein the priority level is set to a priority level of the dedicated data.

17. The apparatus of claim 1, wherein the system information block, the paging message, or both comprises the system information block and the instructions to determine the priority level are executable by the processor to cause the apparatus to:

determine the priority level based at least in part on a broadcast status of the system information block, whether the system information block comprises a cell-specific update or an area-specific update, a type of the system information block, whether the system information block is periodic or on-demand, or a combination thereof.

18. An apparatus for wireless communications at a first user equipment (UE), comprising:

a processor;

memory coupled with the processor; and instructions stored in the memory and executable by the processor to cause the apparatus to:

determine a priority level associated with relaying a system information block, a paging message, or both on a sidelink channel;

determine a set of one or more resources for receiving the system information block, the paging message, or both based at least in part on the priority level;

receive, from a second UE on the sidelink channel, the system information block, the paging message, or both in the determined set of one or more resources;

determine a scheduled communication on a second channel at least partially overlapping in time with the set of one or more resources; and determine a power scaling value based at least in part on the priority level and a second priority level for the second channel, wherein the system information block, the paging message, or both are received based at least in part on the power scaling value.

19. The apparatus of claim 18, wherein the instructions are further executable by the processor to cause the apparatus to:

receive, from the second UE on the sidelink channel, a sidelink control information message indicating the set of one or more resources for receiving a message comprising the system information block, the paging message, or both, wherein the sidelink control information message comprises a field indicating that the message corresponds to system information, paging information, or both.

20. The apparatus of claim 18, wherein the instructions are further executable by the processor to cause the apparatus to:

determine a defined set of one or more transmission occasions for receiving the system information block, the paging message, or both on the sidelink channel, wherein the defined set of one or more transmission occasions comprises the set of one or more resources;

perform a wake up procedure prior to the set of one or more resources; and monitor the set of one or more resources for the system information block, the paging message, or both based at least in part on the defined set of one or more transmission occasions.

21. The apparatus of claim 18, wherein the instructions are further executable by the processor to cause the apparatus to:

schedule a communication on the second channel at least partially overlapping in time with the set of one or more resources;

compare the priority level to the second priority level for the second channel; and refrain from communicating the scheduled communication on the second channel based at least in part on the comparing.

22. An apparatus for wireless communications at a base station, comprising:

49 a processor;

memory coupled with the processor; and instructions stored in the memory and executable by the processor to cause the apparatus to:

determine a priority level associated with relaying a system information block, a paging message, or both on a sidelink channel, wherein the priority level is for a signaling radio bearer (SRB) configured for system information, paging messages, or both, wherein determining the priority level for the SRB is based at least in part on:

a second priority level for a second SRB that is configured for unicast radio resource control messages communicated over an interface between the first UE and a second UE and a third priority level for a third SRB that is configured for non-access stratum messages or other types of radio resource control messages;

transmit, to a user equipment (UE), a message configuring the UE with the priority level; and transmit, to the UE, the system information block, the paging message, or both.

23. The apparatus of claim 22, wherein the priority level for the SRB is higher than the second priority level for] the second SRB and lower than the third priority level for the third SRB.

24. The apparatus of claim 22, wherein the message comprises a radio resource control message comprising a field indicating the priority level.

25. The apparatus of claim 22, wherein the instructions are further

50 executable by the processor to cause the apparatus to:

transmit, to the UE, a radio resource control message configuring a defined set of one or more transmission occasions for the UE to relay the system information block, the paging message, or both on the sidelink channel.

26. A method for wireless communications at a first user equipment (UE), comprising receiving, from a base station, a system information block, a paging message, or both, wherein a signaling radio bearer (SRB) is configured for the system information block, the paging message, or both;

determining a priority level associated with relaying the system information block, the paging message, or both on a sidelink channel, wherein the priority level is for the SRB configured for system information, paging messages, or both, wherein a second priority level is for a second SRB that is configured for unicast radio resource control messages communicated over an interface between the first UE and a second UE, and wherein a third priority level is for a third SRB that is configured for non-access stratum messages or other types of radio resource control messages; and transmitting, to the second UE on the sidelink channel, the system information block, the paging message, or both based at least in part on the priority level, the second priority level, and the third priority level.

* * * * *